(12) United States Patent
Duda

(10) Patent No.: US 11,115,615 B1
(45) Date of Patent: Sep. 7, 2021

(54) AUGMENTED REALITY DISPLAY OF LOCAL INFORMATION

(71) Applicant: AMAZON TECHNOLOGIES, INC., Seattle, WA (US)

(72) Inventor: Amanda M. Duda, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/274,144

(22) Filed: Feb. 12, 2019

Related U.S. Application Data

(60) Provisional application No. 62/635,077, filed on Feb. 26, 2018.

(51) Int. Cl.
  *H04N 5/445* (2011.01)
  *G06Q 50/26* (2012.01)
  *H04N 5/232* (2006.01)

(52) U.S. Cl.
  CPC ....... *H04N 5/44504* (2013.01); *G06Q 50/265* (2013.01); *H04N 5/23293* (2013.01)

(58) Field of Classification Search
  CPC ........... H04N 5/44504; H04N 5/23293; G06Q 50/265
  USPC .................................................... 348/333.02
  See application file for complete search history.

(56) References Cited

U.S. PATENT DOCUMENTS

| | | |
|---|---|---|
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |

(Continued)

*Primary Examiner* — Lin Ye
*Assistant Examiner* — Chan T Nguyen
(74) *Attorney, Agent, or Firm* — Lathrop GPM LLP

(57) ABSTRACT

A mobile computing device displays crime information of a street associated with a current location of the mobile computing device on a display of the mobile computing device. The mobile computing device communicates a request for crime information associated with the current location of the mobile computing device to at least one server and receives the requested crime information. The mobile computing device generates an augmented reality view of the current location by overlaying the requested crime information upon a live view of the current location on the display of the mobile computing device.

19 Claims, 29 Drawing Sheets

(56) References Cited

U.S. PATENT DOCUMENTS

| | | |
|---|---|---|
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2014/0160156 A1* | 6/2014 | Allen .................. G06T 11/00 345/633 |
| 2014/0244160 A1* | 8/2014 | Cragun ............. G01C 21/3679 701/436 |
| 2016/0212327 A1* | 7/2016 | Dietel ................ H04N 21/2187 |
| 2016/0248968 A1* | 8/2016 | Baldwin .................... G06T 7/70 |
| 2018/0047267 A1* | 2/2018 | Modestine ................ G06T 7/13 |
| 2020/0097726 A1* | 3/2020 | Gurule .................. H04N 21/84 |

\* cited by examiner

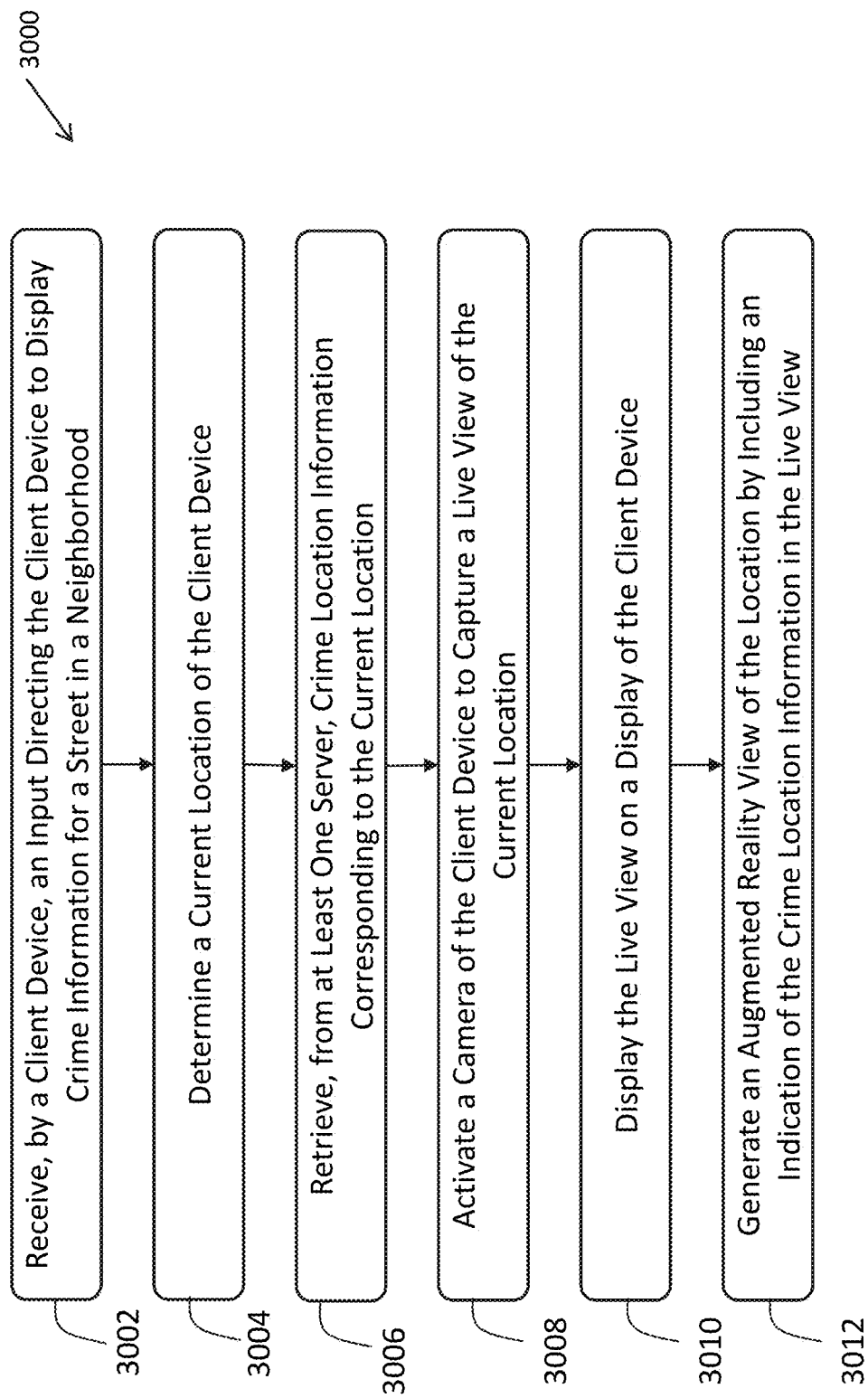

AUGMENTED REALITY DISPLAY OF LOCAL INFORMATION

RELATED APPLICATION

This application claims priority to U.S. Provisional Patent Application Ser. No. 62/635,077, titled "Augmented Reality Display of Local Crime Information," filed on Feb. 26, 2018, and incorporated herein by reference in its entirety.

TECHNICAL FIELD

The present embodiments relate to mobile augmented realty (AR) applications. In particular, the present embodiments relate to improvements in the functionality of mobile AR applications that strengthen the ability of mobile devices to reduce crime and enhance public safety.

BACKGROUND

Neighborhood safety and security is a concern for many individuals and groups. In an effort to improve neighborhood safety, individuals often seek to share information with others and/or with law enforcement. Neighborhood watch programs, for example, enable sharing information for the purpose of preventing and/or reducing crime and other neighborhood incidents.

BRIEF DESCRIPTION OF THE DRAWINGS

The various embodiments of the present augmented reality display of local crime information now will be discussed in detail with an emphasis on highlighting the advantageous features. These embodiments depict the novel and non-obvious augmented reality display of local crime information shown in the accompanying drawings, which are for illustrative purposes only. These drawings include the following figures, in which like numerals indicate like parts:

FIG. 30 is a flowchart illustrating one example method for displaying safety information associated with a street in a neighborhood (or any other area).

DETAILED DESCRIPTION

Figure 1:
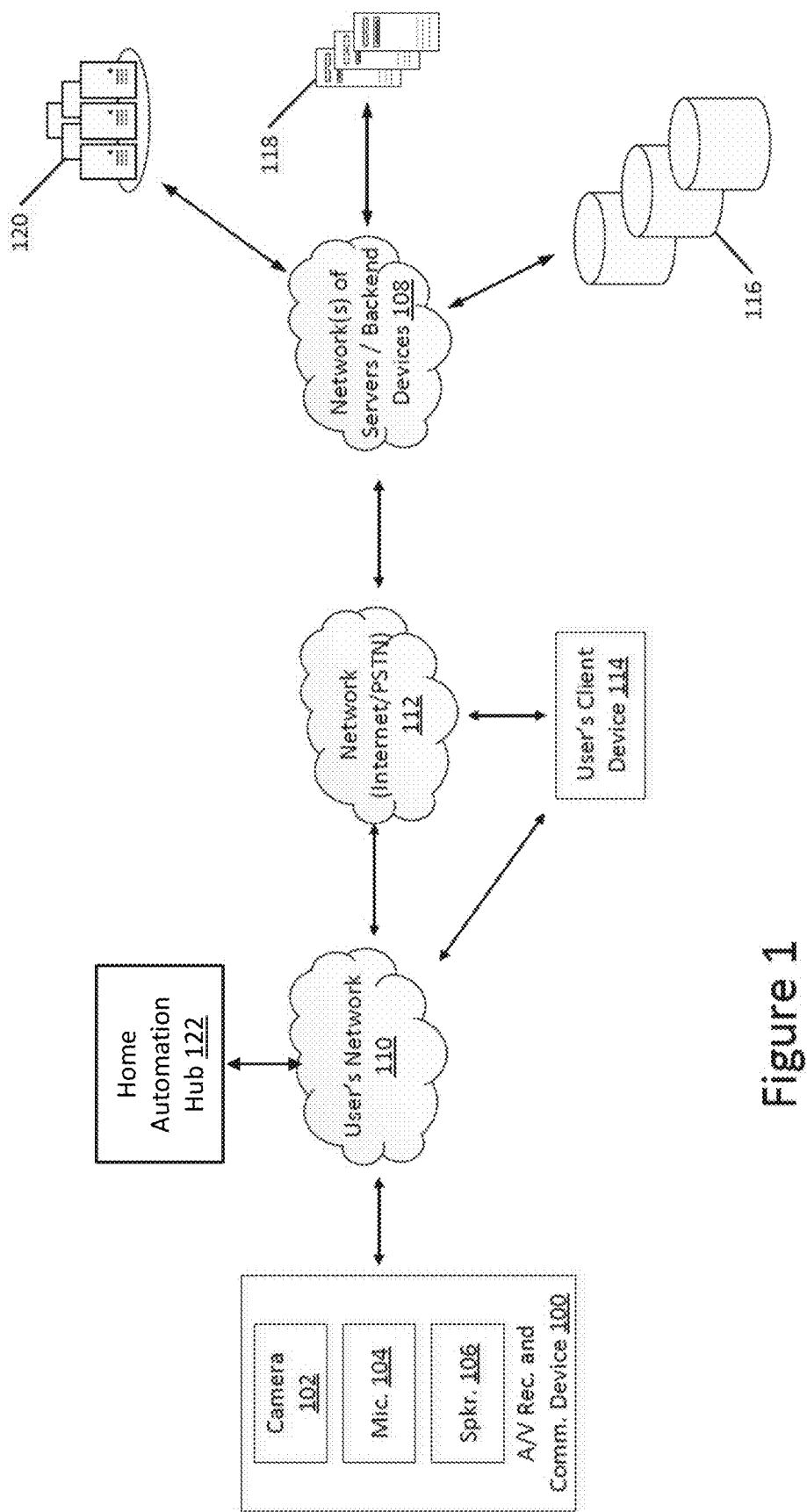
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The various embodiments of the present augmented reality display of local crime information have several features, no single one of which is solely responsible for their desirable attributes. Without limiting the scope of the present embodiments as expressed by the claims that follow, their more prominent features now will be discussed briefly. After considering this discussion, one will understand how the features of the present embodiments provide the advantages described herein.

One aspect of the present embodiments includes the realization that people may lack an effective tool for staying informed about the crime and safety-related incidents that occur around their homes and neighborhoods. Another aspect of the present embodiments includes the realization that people may lack an effective tool for learning about the crime and safety-related incidents that have occurred in unfamiliar areas (e.g., neighborhoods), which may thus cause people to unknowingly enter unsafe areas. Another aspect of the present embodiments includes the realization that neighborhood watch programs may not be engaging, and may not provide the ability to report and consume relevant data in a visual and real-time manner. Moreover, neighborhood watch programs may not provide adequate information needed for making informed decisions when navigating through a neighborhood.

The present embodiments solve these problems by providing a tool that engages a person in real time as the person navigates a neighborhood (or any other area) in order to better connect the person to crime information and other related safety information within the neighborhood. For example, some of the present embodiments provide a tool for enabling a person to walk around a neighborhood and visualize crime information at exact locations where incidents have occurred. Embodiments further provide a tool that presents a person with crime information about streets in a neighborhood in order to aid the person in safely navigating the neighborhood. Embodiments further provide a tool that enables the person to identify crime information and other relevant safety information, and to share that information with other people, including law enforcement, as the person is navigating the neighborhood and discovers such information.

With reference to FIG. 1, the present embodiments include an audio/video (A/V) recording and communication device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. In another example, the present embodiments may include one or more A/V recording and communication floodlight controllers instead of, or in addition to, one or more A/V recording and communication doorbells.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or any other image display resolution. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone.

The A/V recording and communication device 100 may also communicate, via the user's network 110 and the network 112 (Internet/PSTN), with a network(s) 108 of backend devices, such as (but not limited to) one or more remote storage devices 116 (may be referred to interchangeably as "cloud storage device(s)"), one or more servers 118, and one or more APIs 120. While FIG. 1 illustrates the storage device 116, the server 118, and the API 120 as components separate from the network 112, it is to be understood that the storage device 116, the server 118, and/or the API 120 may be considered to be components of the network 112.

In one example, A/V recording and communication device 100 may also communicate, via the user's network 110, to a home automation hub 122. A home automation hub 122 may be a computing device configured to communicate with and interact with multiple A/V recording and communication device 100 within the user's network 110 and to provide various suitable interactive functions and features to the user.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE CatNB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GNSS (global navigation satellite system, e.g., GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a API 120 including one or more components. A API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A API may, for example, comprise many such applications, each of which communicate with one another using their public APIs. In some embodiments, the API backend may hold the bulk of the user data and offer the user management capabilities, leaving the clients to have very limited state.

The API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
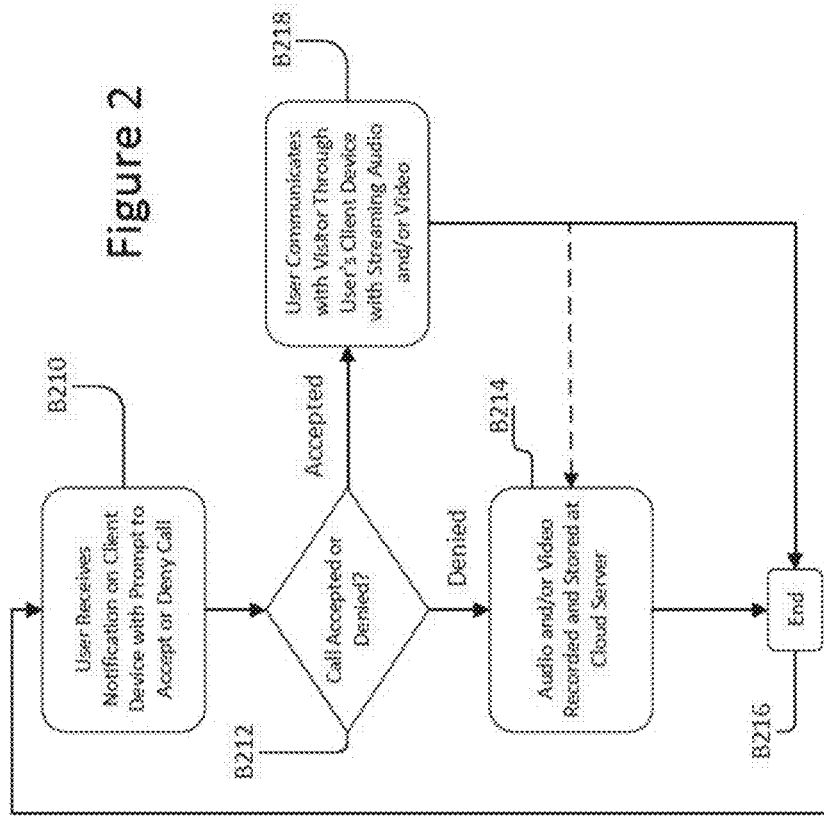
FIG. 2 is a flowchart illustrating a process for streaming and storing A/V content from an A/V recording and communication device according to various aspects of the present disclosure.
Figure 2:
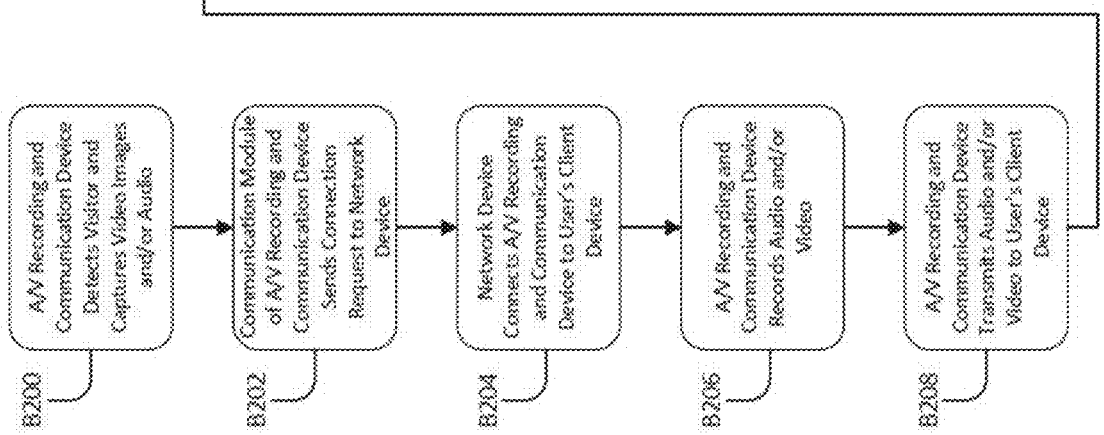

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 4:
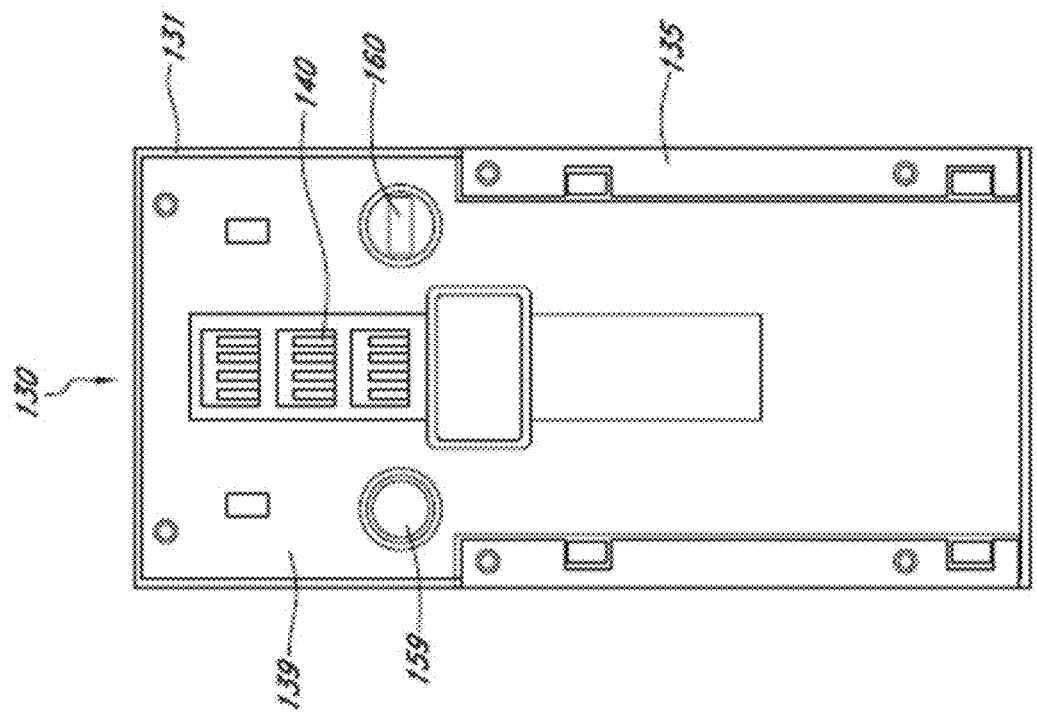
FIG. 4 is a rear view of the A/V recording and communication doorbell of FIG. 3.
Figure 3:
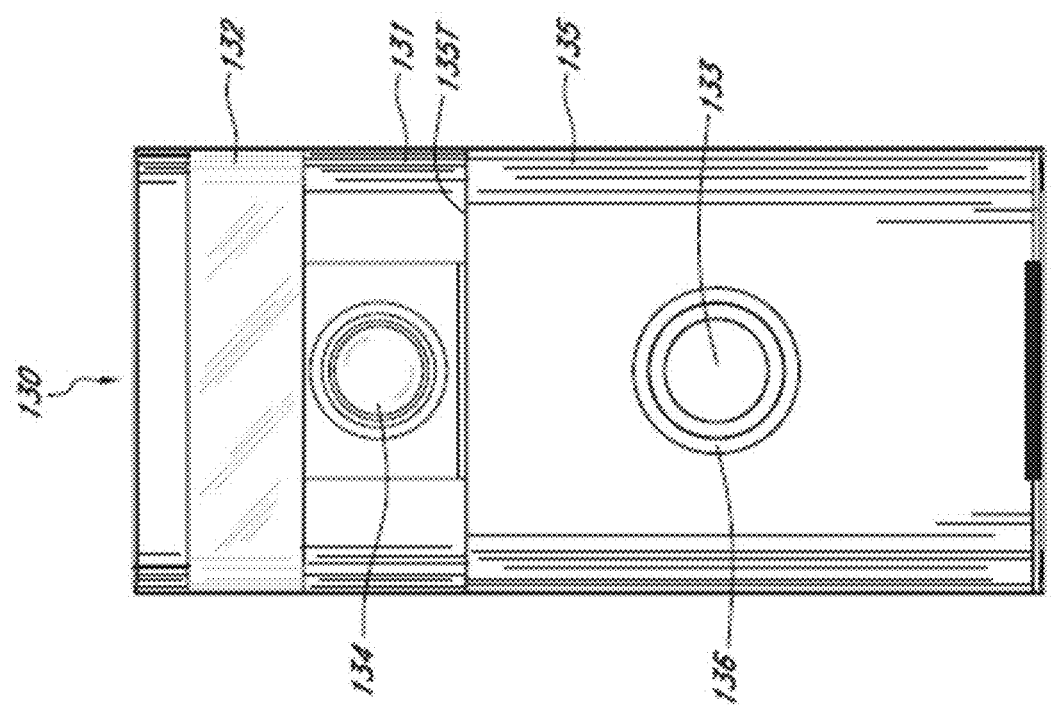
FIG. 3 is a front view of an A/V recording and communication doorbell according to various aspects of the present disclosure.
Figure 5:
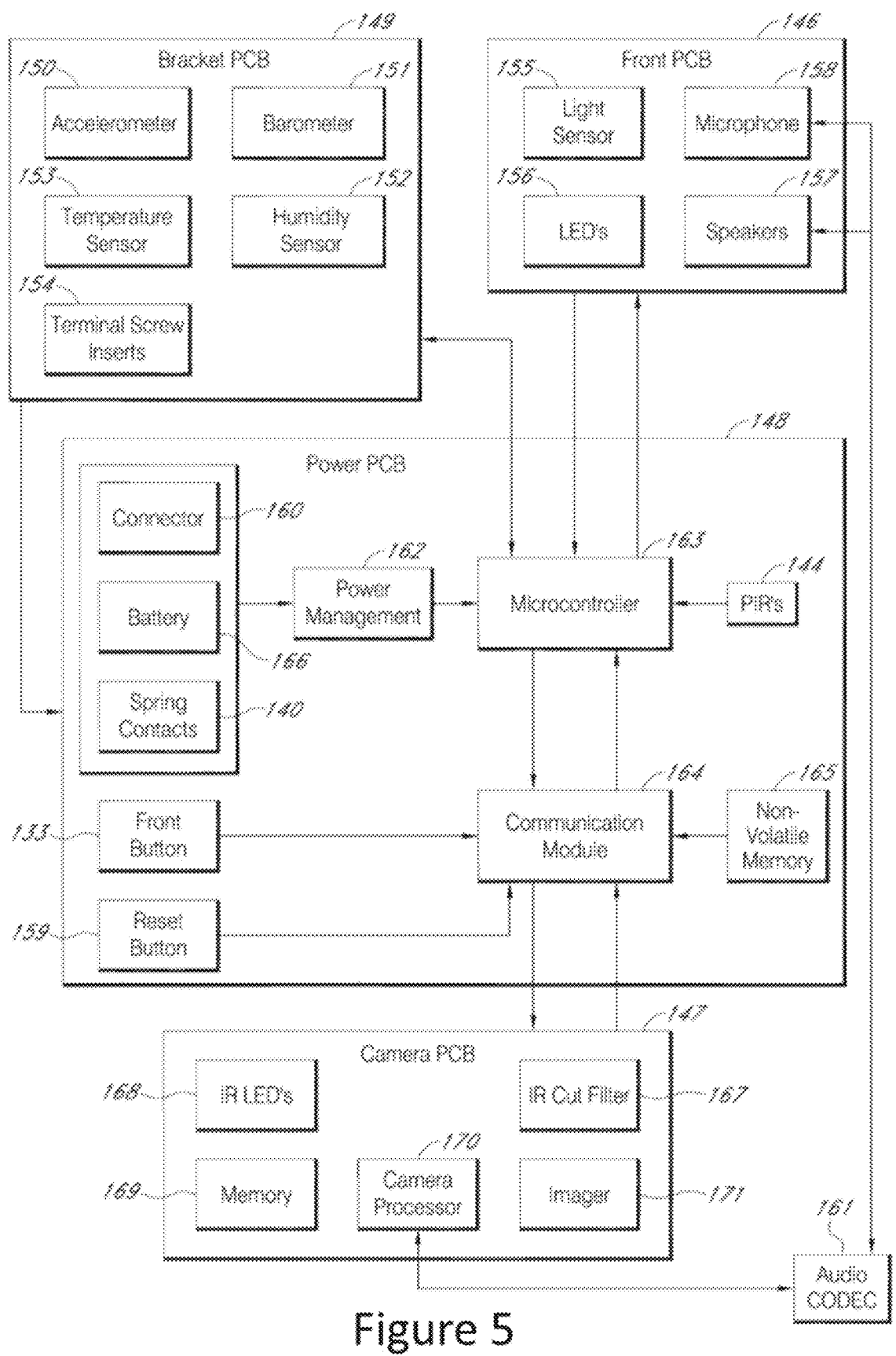
FIG. 5 is a functional block diagram of the components of the A/V recording and communication doorbell of FIGS. 3 and 4.

FIGS. 3-5 illustrate an audio/video (A/V) communication doorbell 130 according to an aspect of present embodiments. FIG. 3 is a front view, FIG. 4 is a rear view, and FIG. 5 is a functional block diagram of the components within or in communication with the doorbell 130. With reference to FIG. 3, the doorbell 130 includes a faceplate 135 mounted to a back plate 139 (FIG. 4). The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With further reference to FIG. 3, the doorbell 130 further includes an enclosure 131 that engages the faceplate 135. In the illustrated embodiment, the enclosure 131 abuts an upper edge 135T of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a functional block diagram of the components within or in communication with the doorbell 130, according to an aspect of the present embodiments. A bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. The bracket PCB 149 may be located outside the housing of the doorbell 130 so as to reduce interference from heat, pressure, moisture, and/or other stimuli generated by the internal components of the doorbell 130.

With further reference to FIG. 5, the bracket PCB 149 may further comprise terminal screw inserts 154, which may be configured to receive terminal screws (not shown) for transmitting power to electrical contacts on a mounting bracket (not shown). The bracket PCB 149 may be electrically and/or mechanically coupled to the power PCB 148 through the terminal screws, the terminal screw inserts 154, the spring contacts 140, and the electrical contacts. The terminal screws may receive electrical wires located at the surface to which the doorbell 130 is mounted, such as the wall of a building, so that the doorbell can receive electrical power from the building's electrical system. Upon the terminal screws being secured within the terminal screw inserts 154, power may be transferred to the bracket PCB 149, and to all of the components associated therewith, including the electrical contacts. The electrical contacts may transfer electrical power to the power PCB 148 by mating with the spring contacts 140.

With further reference to FIG. 5, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by the one or more servers 118, and delivered to the user's client device 114. When the user speaks, after being transferred through the network 112, digital audio data is decompressed by audio CODEC 161 and emitted to the visitor via the speakers 157.

With further reference to FIG. 5, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 5, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 5, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 5, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p, 1080p, etc.) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133 and its associated components. An example A/V recording and communication security camera may further omit other components, such as, for example, the bracket PCB 149 and its associated components.

Figure 6:
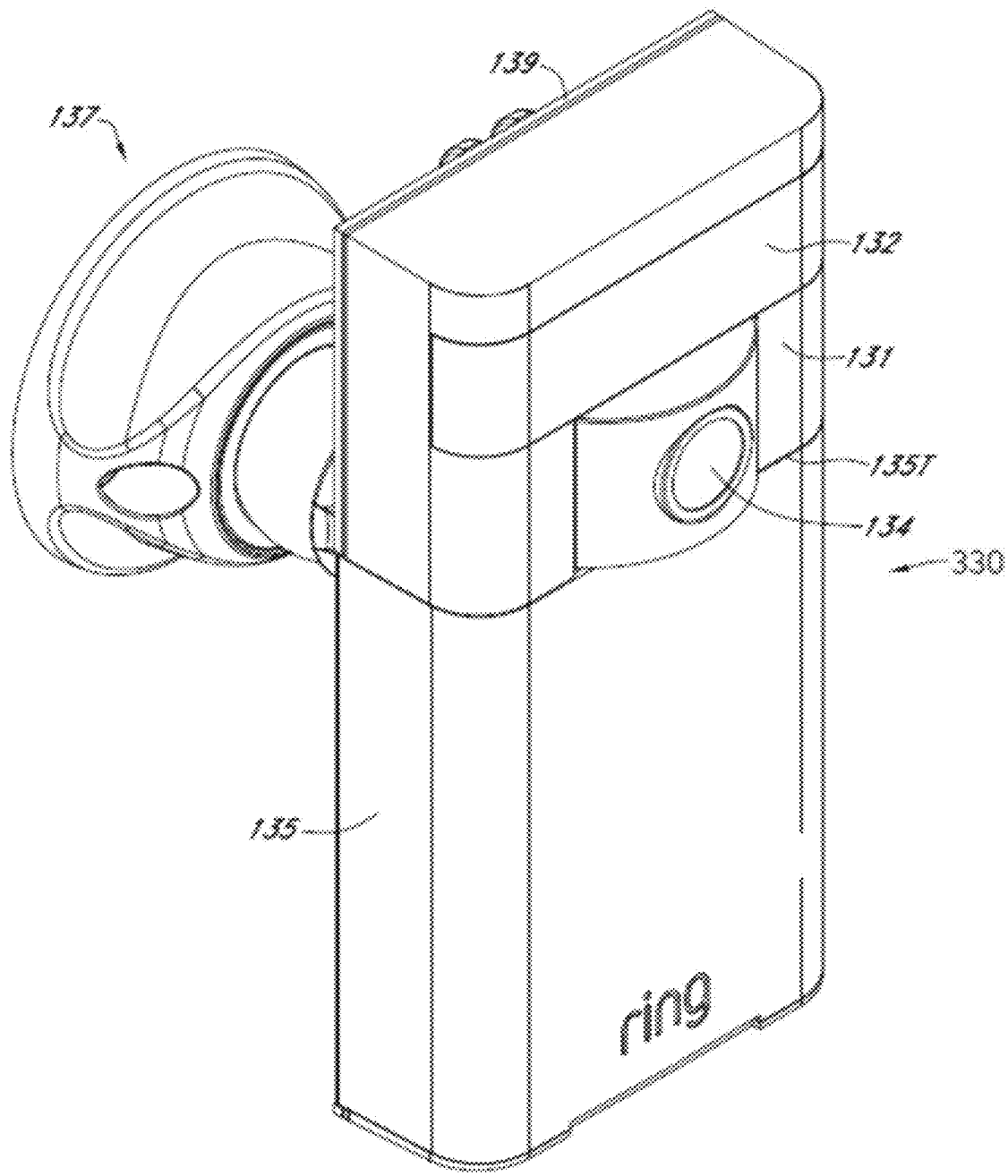
FIG. 6 is an upper front perspective view of an A/V recording and communication security camera according to various aspects of the present disclosure.
Figure 7:
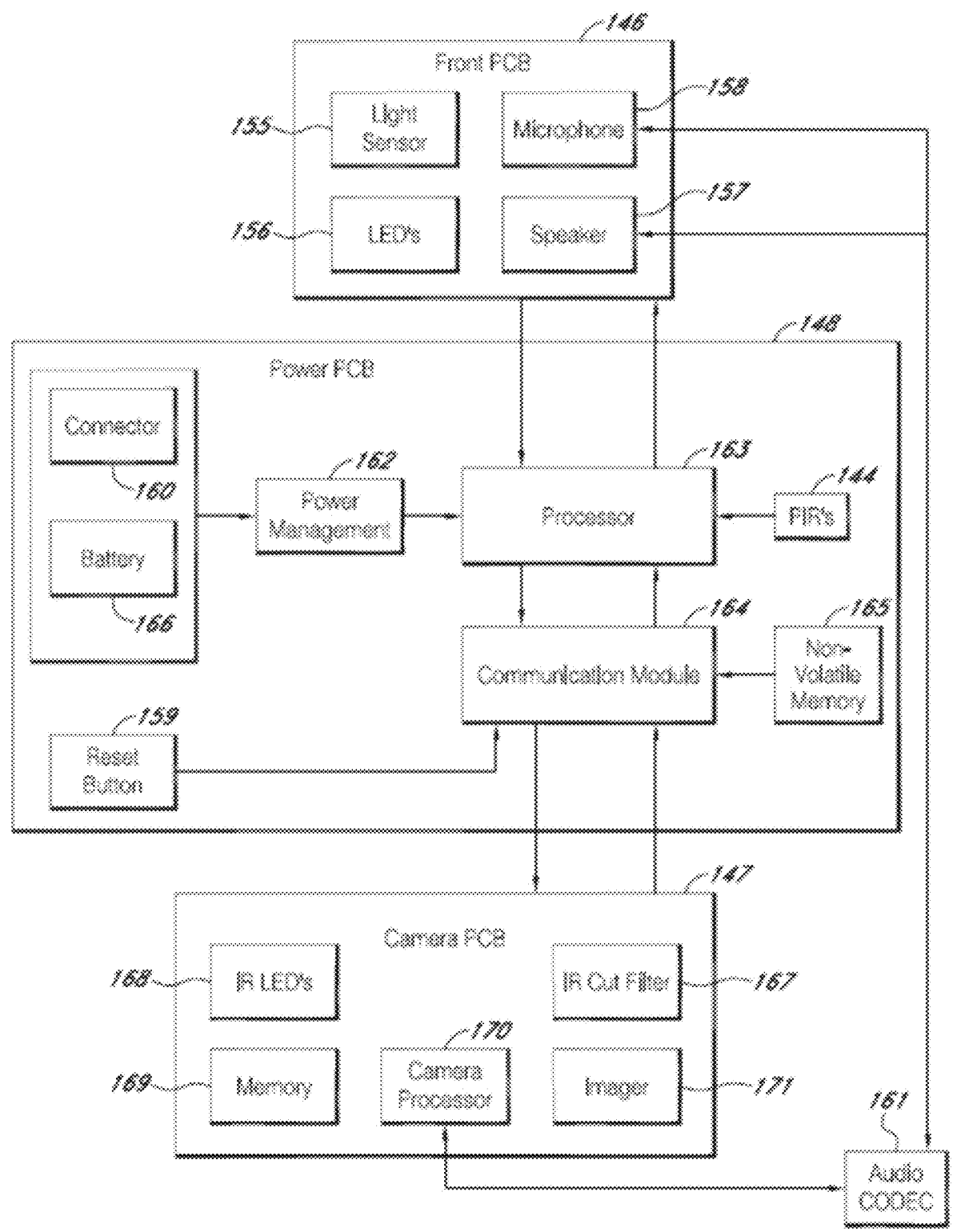
FIG. 7 is a functional block diagram of the components of the A/V recording and communication security camera of FIG. 6.

FIGS. 6 and 7 illustrate an example A/V recording and communication security camera according to various aspects of the present embodiments. With reference to FIG. 6, the security camera 330, similar to the video doorbell 130, includes a faceplate 135 that is mounted to a back plate 139 and an enclosure 131 that engages the faceplate 135. Collectively, the faceplate 135, the back plate 139, and the enclosure 131 form a housing that contains and protects the inner components of the security camera 330. However, unlike the video doorbell 130, the security camera 330 does not include any front button 133 for activating the doorbell. The faceplate 135 may comprise any suitable material, including, without limitation, metals, such as brushed aluminum or stainless steel, metal alloys, or plastics. The faceplate 135 protects the internal contents of the security camera 330 and serves as an exterior front surface of the security camera 330.

With continued reference to FIG. 6, the enclosure 131 engages the faceplate 135 and abuts an upper edge 135T of the faceplate 135. As discussed above with reference to FIG. 3, in alternative embodiments, one or more gaps between the enclosure 131 and the faceplate 135 may facilitate the passage of sound and/or light through the security camera 330. The enclosure 131 may comprise any suitable material, but in some embodiments the material of the enclosure 131 preferably permits infrared light to pass through from inside the security camera 330 to the environment and vice versa. The security camera 330 further includes a lens 132. Again, similar to the video doorbell 130, in some embodiments, the lens may comprise a Fresnel lens, which may be patterned to deflect incoming light into one or more infrared sensors located within the security camera 330. The security camera 330 further includes a camera 134, which captures video data when activated, as described above and below.

With further reference to FIG. 6, the enclosure 131 may extend from the front of the security camera 330 around to the back thereof and may fit snugly around a lip (not shown) of the back plate 139. The back plate 139 may comprise any suitable material, including, without limitation, metals, such as brushed aluminum or stainless steel, metal alloys, or plastics. The back plate 139 protects the internal contents of the security camera 330 and serves as an exterior rear surface of the security camera 330. The faceplate 135 may extend from the front of the security camera 330 and at least partially wrap around the back plate 139, thereby allowing a coupled connection between the faceplate 135 and the back plate 139. The back plate 139 may have indentations (not shown) in its structure to facilitate the coupling.

With continued reference to FIG. 6, the security camera 330 further comprises a mounting apparatus 137. The mounting apparatus 137 facilitates mounting the security camera 330 to a surface, such as an interior or exterior wall of a building, such as a home or office. The faceplate 135 may extend from the bottom of the security camera 330 up to just below the camera 134, and connect to the back plate 139 as described above. The lens 132 may extend and curl partially around the side of the security camera 330. The enclosure 131 may extend and curl around the side and top of the security camera 330, and may be coupled to the back plate 139 as described above. The camera 134 may protrude from the enclosure 131, thereby giving it a wider field of view. The mounting apparatus 137 may couple with the back plate 139, thereby creating an assembly including the security camera 330 and the mounting apparatus 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 7 is a functional block diagram of the components of the A/V recording and communication security camera of FIG. 6. With reference to FIG. 7, the interior of the wireless security camera 130 comprises a plurality of printed circuit boards, including a front PCB 146, a camera PCB 147, and a power PCB 148, each of which is described below. The camera PCB 147 comprises various components that enable the functionality of the camera 134 of the security camera 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the security camera 130 can clearly capture images at night (may be referred to as "night vision").

The front PCB 146 comprises various components that enable the functionality of the audio and light components, including a light sensor 155, one or more speakers 157, and a microphone 158. The light sensor 155 may be one or more sensors capable of detecting the level of ambient light of the surrounding environment in which the security camera 130 may be located. The speakers 157 may be any electromechanical device capable of producing sound in response to an electrical signal input. The microphone 158 may be an acoustic-to-electric transducer or sensor capable of converting sound waves into an electrical signal. The front PCB 146 and all components thereof may be electrically coupled to the power PCB 148, thereby allowing data and/or power to be transferred to and from the power PCB 148 and the front PCB 146.

The speakers 157 and the microphone 158 may be coupled to a camera processor 170 on the camera PCB 147 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With continued reference to FIG. 7, the power PCB 148 comprises various components that enable the functionality of the power and device-control components, including a power management module 162, a processor 163, a communication module 164, and power PCB non-volatile memory 165. In certain embodiments, the power management module 162 may comprise an integrated circuit capable of arbitrating between multiple voltage rails, thereby selecting the source of power for the security camera 130. The battery 166 and/or the connector 160 may each provide power to the power management module 162. The power management module 162 may have separate power rails dedicated to the battery 166 and the connector 160. The power management module 162 may control charging of the battery 166 when the connector 160 is connected to an external source of power, and may also serve as a conduit for data between the connector 160 and the processor 163.

With further reference to FIG. 7, in certain embodiments the processor 163 may comprise an integrated circuit including a processor core, memory, and programmable input/output peripherals. The processor 163 may receive input signals, such as data and/or power, from the PIR sensors 144, the power management module 162, the light sensor 155, the microphone 158, and/or the communication module 164, and may perform various functions as further described below. When the processor 163 is triggered by the PIR sensors 144, the processor 163 may be triggered to perform one or more functions, such as initiating recording of video images via the camera 134. When the light sensor 155 detects a low level of ambient light, the light sensor 155 may trigger the processor 163 to enable "night vision," as further described below. The processor 163 may also act as a conduit for data communicated between various components and the communication module 164.

With further reference to FIG. 7, the security camera 130 further comprises a communication module 164 coupled to the power PCB 148. The communication module 164 facilitates communication with devices in one or more remote locations, as further described below. The communication module 164 may comprise an integrated circuit including a processor core, memory, and programmable input/output peripherals. The communication module 164 may also be configured to transmit data wirelessly to a remote network device, such as the user's client device 114, the remote storage device 116, and/or the remote server 118, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the processor 163, the reset button 159, and/or the power PCB non-volatile memory 165. When the reset button 159 is pressed, the communication module 164 may be triggered to erase any data stored at the power PCB non-volatile memory 165 and/or at the camera PCB memory 169. The communication module 164 may also act as a conduit for data communicated between various components and the processor 163. The power PCB non-volatile memory 165 may comprise flash memory configured to store and/or transmit data. For example, in certain embodiments the power PCB non-volatile memory 165 may comprise serial peripheral interface (SPI) flash memory.

With continued reference to FIG. 7, the power PCB 148 further comprises the connector 160 described above and a battery 166. The connector 160 may protrude outward from the power PCB 148 and extend through a hole in the back plate 139. The battery 166, which may be a rechargeable battery, may provide power to the components of the security camera 130.

With continued reference to FIG. 7, the power PCB 148 further comprises passive infrared (PIR) sensors 144, which may be secured on or within a PIR sensor holder (not shown) that resides behind the lens 132 (FIG. 6). The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

With further reference to FIG. 7, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the security camera 130 enclosure out to the environment, and the IR cut filter 167 may enable the imager 171 to see this infrared light as it is reflected or refracted off of objects within the field of view of the doorbell. This process may provide the security camera 130 with the "night vision" function mentioned above.

Figure 8:
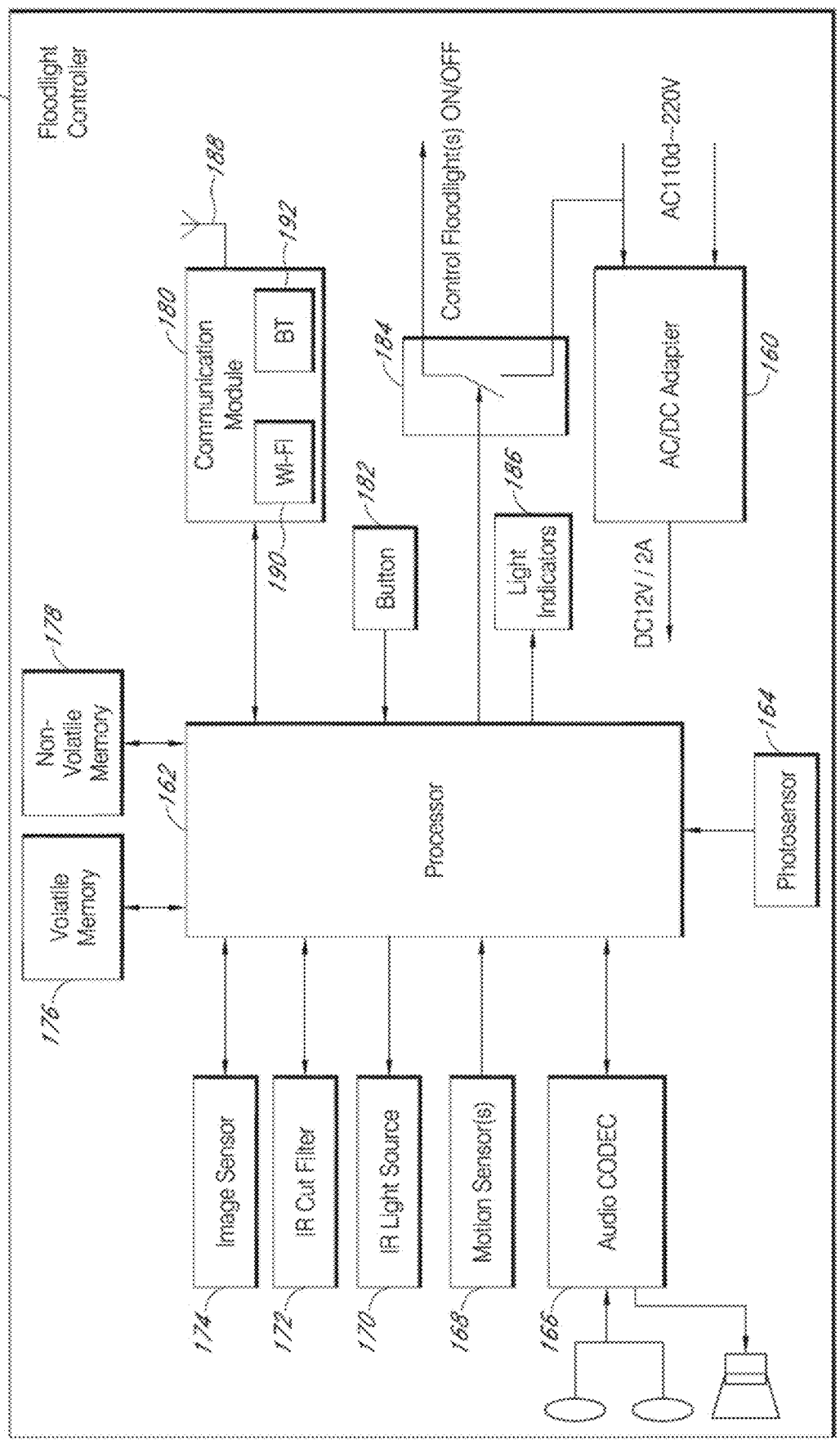
FIG. 8 is a functional block diagram of the components of a floodlight controller with A/V recording and communication features according to various aspects of the present disclosure.
Figure 9:
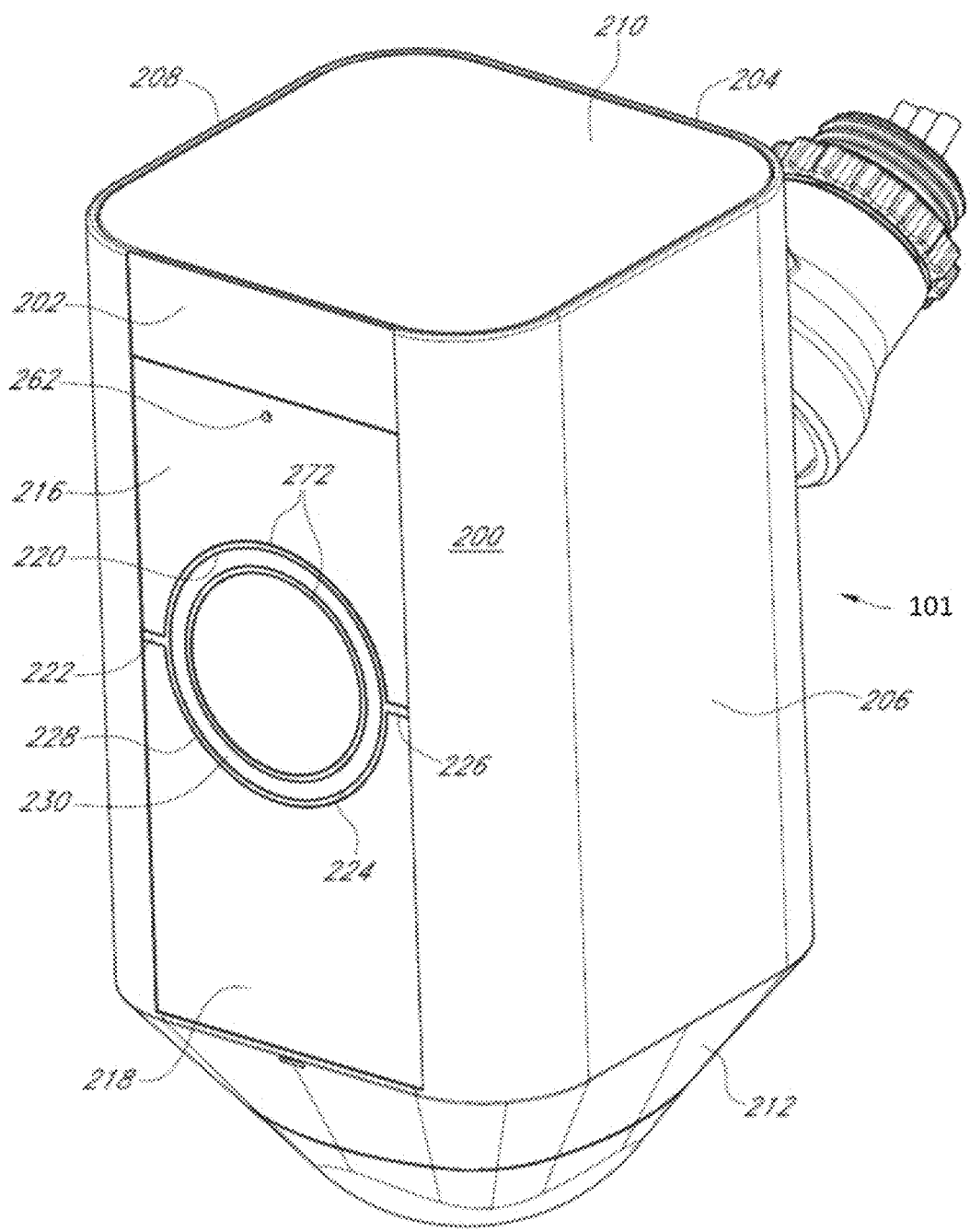
FIG. 9 is an upper front perspective view of a floodlight controller with A/V recording and communication features according to various aspects of the present disclosure.
Figure 10:
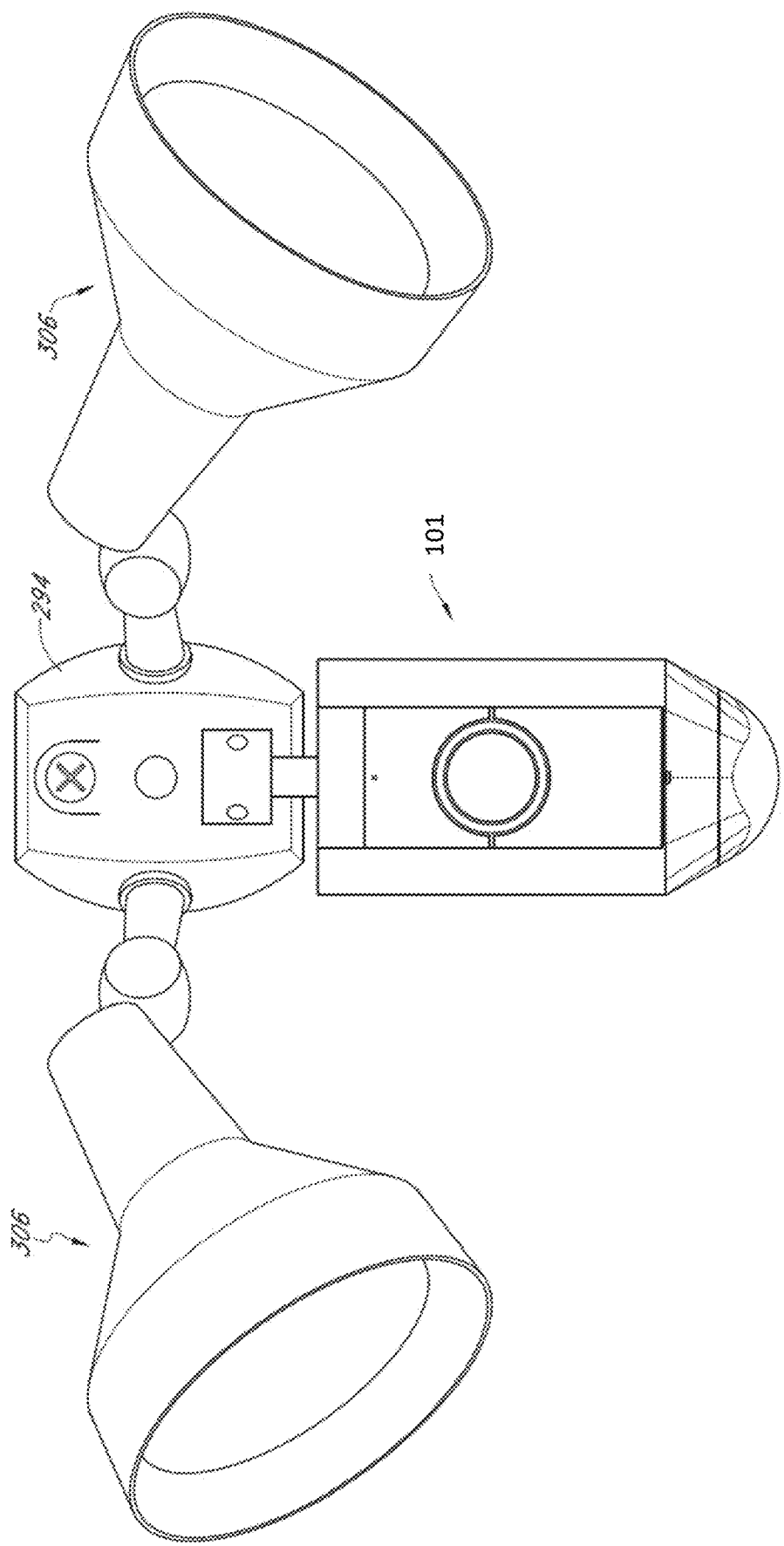
FIG. 10 is a front elevation view of the floodlight controller with A/V recording and communication features of FIG. 9 in combination with a floodlight device according to various aspects of the present disclosure.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication floodlight controllers instead of, or in addition to, one or more A/V recording and communication doorbells. FIGS. 8-10 illustrate an example A/V recording and communication floodlight controller 101 according to various aspects of the present embodiments. FIG. 8 is a functional block diagram illustrating various components of the floodlight controller 101 and their relationships to one another. For example, the floodlight controller 101 comprises an AC/DC adapter 160. The floodlight controller 101 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 160, which may convert the incoming AC power to DC (direct-current) and may step down the voltage from 110-220 VAC to a lower output voltage of about 12 VDC and an output current of about 2 A, for example. In various embodiments, the output of the AC/DC adapter 160 may be in a range of from about 9 V to about 15 V, for example, and in a range of from about 0.5 A to about 5 A, for example. These voltages and currents are only examples provided for illustration and are not limiting in any way.

With further reference to FIG. 8, the floodlight controller 101 further comprises other components, including a processor 162 (may also be referred to as a controller), a photosensor 164, an audio CODEC (coder-decoder) 166, the at least one speaker 108, the at least one microphone 106, at least one motion sensor 168, an infrared (IR) light source 170, an IR cut filter 172, an image sensor 174 (may be a component of the camera 104, and may be referred to interchangeably as the camera 104), volatile memory 176, non-volatile memory 178, a communication module 180, a button 182, a switch 184 for controlling one or more floodlights, and a plurality of light indicators 186. Each of these components is described in detail below.

With further reference to FIG. 8, the processor 162 may perform data processing and various other functions, as described below. The processor 162 may comprise an integrated circuit including a processor core, the volatile memory 176, the non-volatile memory 178, and/or programmable input/output peripherals (not shown). The volatile memory 176 may comprise, for example, DDR3 SDRAM (double data rate type three synchronous dynamic random-access memory). The non-volatile memory 178 may comprise, for example, NAND flash memory. In the embodiment illustrated in FIG. 8, the volatile memory 176 and the non-volatile memory 178 are illustrated outside the box representing the processor 162. The embodiment illustrated in FIG. 8 is, however, merely an example, and in some embodiments the volatile memory 176 and/or the non-volatile memory 178 may be physically incorporated with the processor 162, such as on the same chip. The volatile memory 176 and/or the non-volatile memory 178, regardless of their physical location, may be shared by one or more other components (in addition to the processor 162) of the present floodlight controller 101.

With further reference to FIG. 8, the image sensor 174 (camera 104), the IR light source 170, the IR cut filter 172, and the photosensor 164 are all operatively coupled to the processor 162. As described in detail below, the IR light source 170 and the IR cut filter 172 facilitate "night vision" functionality of the camera 104. For example, the photosensor 164 is configured to detect the level of ambient light about the floodlight controller 101. The processor 162 uses the input from the photosensor 164 to control the states of the IR light source 170 and the IR cut filter 172 to activate and deactivate night vision, as described below. In some embodiments, the image sensor 174 may comprise a video recording sensor or a camera chip. In some embodiments, the IR light source 170 may comprise one or more IR light-emitting diodes (LEDs).

With further reference to FIG. 8, the at least one speaker 108 and the at least one microphone 106 are operatively coupled to the audio CODEC 166, which is operatively coupled to the processor 162. The transfer of digital audio between the user and a visitor (or intruder) may be compressed and decompressed using the audio CODEC 166, as described below. The motion sensor(s) 168 is also operatively coupled to the processor 162. The motion sensor(s) 168 may comprise, for example, passive infrared (PIR) sensors, or any other type of sensor capable of detecting and communicating to the processor 162 the presence and/or motion of an object within its field of view. When the processor 162 is triggered by the motion sensor(s) 168, the processor 162 may perform one or more functions, as described below.

With further reference to FIG. 8, the communication module 180 is operatively coupled to the processor 162. The communication module 180, which includes at least one antenna 188, is configured to handle communication links between the floodlight controller 101 and other, external devices or receivers, and to route incoming/outgoing data appropriately. For example, inbound data from the antenna (s) 188 may be routed through the communication module 180 before being directed to the processor 162, and outbound data from the processor 162 may be routed through the communication module 180 before being directed to the antenna(s) 188. The communication module 180 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 180 includes a Wi-Fi chip 190 and a Bluetooth chip 192, but these components are merely examples and are not limiting. Further, while the Wi-Fi chip 190 and the Bluetooth chip 192 are illustrated within the box representing the communication module 180, the embodiment illustrated in FIG. 8 is merely an example, and in some embodiments the Wi-Fi chip 190 and/or the Bluetooth chip 192 are not necessarily physically incorporated with the communication module 180.

In some embodiments, the communication module 180 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 180, and may thus connect to the user's network 110 through the floodlight controller 101. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 8, when a visitor (or intruder) who is present in the area about the floodlight controller 101 speaks, audio from the visitor (or intruder) is received by the microphone(s) 106 and compressed by the audio CODEC 166. Digital audio data is then sent through the communication module 180 to the network 112 (FIG. 1) via the user's network 110, routed by the server 118 and/or the API 120, and delivered to the user's client device 114. When the user speaks, after being transferred through the network 112, the user's network 110, and the communication module 180, the digital audio data from the user is decompressed by the audio CODEC 166 and emitted to the visitor through the speaker 108, which may be driven by a speaker 108 driver (not shown).

With further reference to FIG. 8, the button 182 is operatively coupled to the processor 162. The button 182 may have one or more functions, such as changing an operating mode of the floodlight controller 101 and/or triggering a reset of the floodlight controller 101. For example, when the button 182 is pressed and released, it may cause the communication module 180 of the floodlight controller 101 to enter access point (AP) mode, which may facilitate connecting the floodlight controller 101 to the user's network 110. Alternatively, or in addition, when the button 182 is pressed and held down for at least a threshold amount of time, it may trigger the erasing of any data stored at the volatile memory 176 and/or at the non-volatile memory 178, and/or may trigger a reboot of the processor 162.

With reference to FIG. 9, the floodlight controller 101 comprises a housing 200 for containing and protecting the interior components of the floodlight controller 101. The housing 200 includes a front wall 202, a rear wall 204, opposing side walls 206, 208, an upper wall 210, and a tapered lower portion 212. The front wall 202 includes a central opening 214 that receives an upper shield 216 and a lower grill 218. In the illustrated embodiment, front surfaces of the upper shield 216 and the lower grill 218 are substantially flush with a front surface of the front wall 202, but in alternative embodiments these surfaces may not be flush with one another. The upper shield 216 is substantially rectangular, and includes a semicircular indentation 220 along its lower edge 222. The lower grill 218 is substantially rectangular, and includes a semicircular indentation 224 along its upper edge 226. Together, the semicircular indentations 220, 224 in the upper shield 216 and the lower grill 218 form a circular opening 228 that accommodates a light pipe 230. A cover 232 extends across and closes an outer open end of the light pipe 230. The upper shield 216, the lower grill 218, the light pipe 230, and the cover 232 are all described in further detail below. The camera (not shown) is located in the circular opening 228 formed by the upper shield 216 and the lower grill 218, behind the cover 232, and is surrounded by the light pipe 230.

With reference to FIG. 8, the floodlight controller 101 further comprises the microphones 106. In the illustrated embodiment, a first one 258 of the microphones 106 is located along the front of the floodlight controller 101 behind the upper shield 216 (FIG. 9) and a second one 260 of the microphones 106 is located along the left side of the floodlight controller 101 behind the left-side wall 208 (FIG. 9) of the housing 200. Including two microphones 258, 260 that are spaced from one another and located on different sides of the floodlight controller 101 provides the illustrated embodiment of the floodlight controller 101 with advantageous noise cancelling and/or echo cancelling for clearer audio. The illustrated embodiment is, however, just one example and is not limiting. Alternative embodiments may only include one microphone 106, or include two microphones 106 in different locations than as illustrated in FIG. 6.

With reference to FIG. 9, the upper shield 216 may include a first microphone opening 262 located in front of the first microphone 258 to facilitate the passage of sound through the upper shield 216 so that sounds from the area about the floodlight controller 101 can reach the first microphone 258. The left-side wall 208 of the housing 200 may include a second microphone opening (not shown) located in front of the second microphone 260 that facilitates the passage of sound through the left-side wall 208 of the housing 200 so that sounds from the area about the floodlight controller 101 can reach the second microphone 260.

With further reference to FIG. 9, the floodlight controller 101 may further comprise a light barrier 272 surrounding inner and outer surfaces of the light pipe 230. The light barrier 272 may comprise a substantially opaque material that prevents the light generated by the light indicators 186 from bleeding into the interior spaces of the floodlight controller 101 around the light pipe 230. The light barrier 272 may comprise a resilient material, such as a plastic, which may also advantageously provide moisture sealing at the junctures between the light pipe 230 and the upper shield 216 and the lower grill 218. Portions of the light barrier 272 may also extend between the junctures between the upper shield 216 and the lower grill 218.

With further reference to FIG. 9, the floodlight controller 101 further comprises connecting hardware 292 configured for connecting the floodlight controller 101 to a floodlight device 294 (FIG. 10) and a power source (not shown). The floodlight controller 101 further comprises a plurality of wires 304 for connecting the floodlight controller 101 to the power supply and to the floodlight(s) 306 (FIG. 10) of the floodlight device 294 (for enabling the floodlight controller 101 to turn the floodlight(s) 306 on and off). In the illustrated embodiment, three wires 304 are shown, but the illustrated embodiment is merely one example and is not limiting. In alternative embodiments, any number of wires 304 may be provided.

As described above, the present embodiments provide a tool that engages a person in real time as the person navigates a neighborhood (or any other area) in order to better connect the person to crime information and other related safety information within the neighborhood. For example, some of the present embodiments provide a tool for enabling a person to walk around a neighborhood and visualize crime information at exact locations where incidents have occurred. Embodiments further provide a tool that presents a person with crime information about streets in a neighborhood in order to aid the person in safely navigating the neighborhood. Embodiments further provide a tool that enables the person to identify crime information and other relevant safety information, and to share that information with other people, including law enforcement, as the person is navigating the neighborhood and discovers such information.

Figure 11:
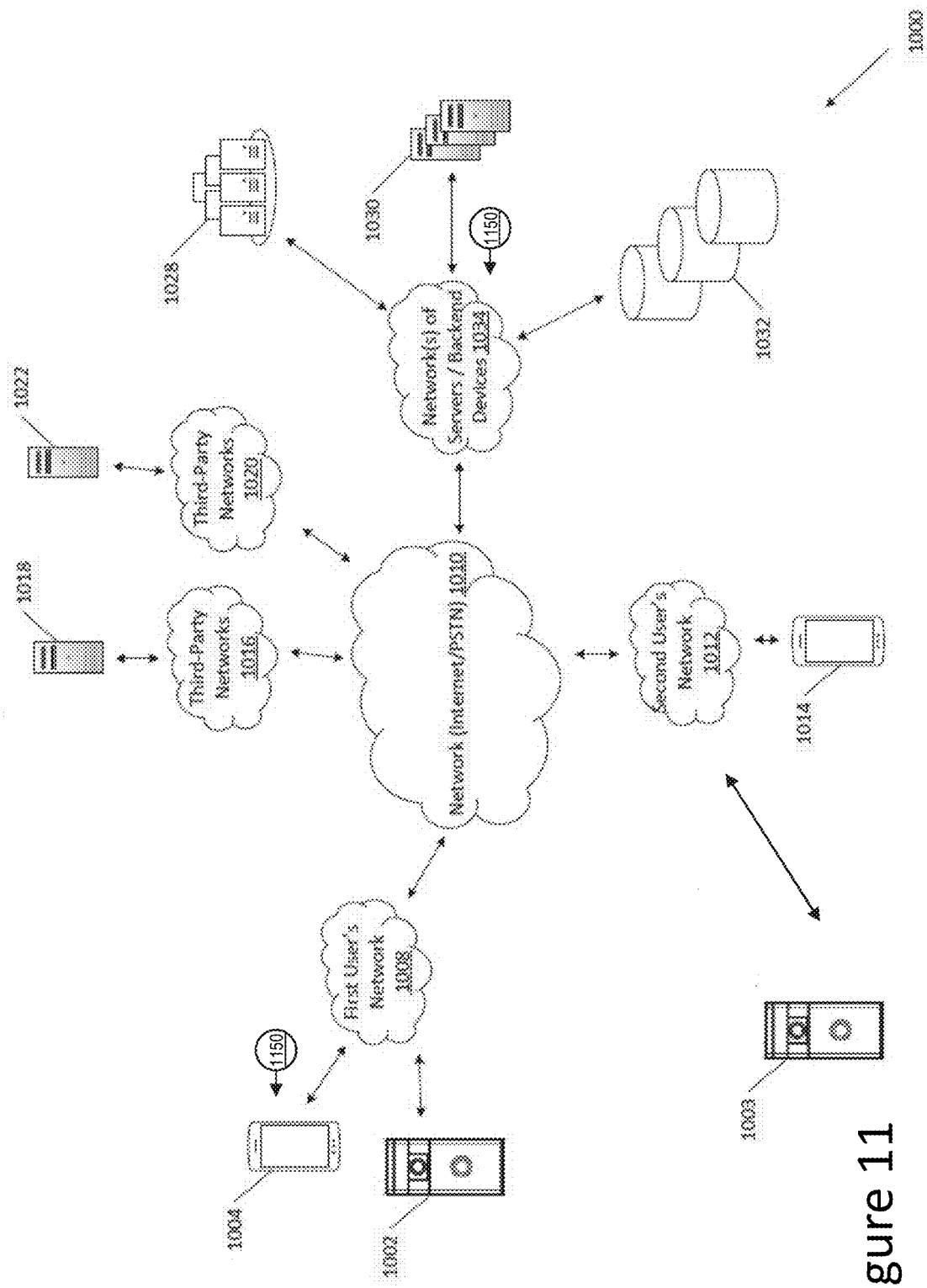
FIG. 11 is a functional block diagram illustrating a system for streaming, storing, and sharing video footage captured by A/V recording and communication devices according to various aspects of the present disclosure.

FIG. 11 is a functional block diagram illustrating a system 1000 for streaming, storing, and sharing video footage captured by audio/video (A/V) recording and communication devices according to various aspects of the present disclosure. One or more first client device(s) may share a video (may also be referred to as "first image data"), audio (may also be referred to as "first audio data"), and/or text (may also be referred to as "first text data") using a share signal, and the network may receive the share signal. The first client device(s) may be associated with first A/V recording and communication device(s) located in a first neighborhood. However, in other embodiments, the first client device(s) may not be associated with any A/V recording and communication device. In many embodiments, a second client device, associated with a second user, may receive the shared video, audio, and/or text when approved for sharing (e.g., by an administrator and/or intelligence of the system 1000). Video, audio, and/or text is accessible only by the owner (e.g., owner of the capturing audio/video recording device) unless shared by the owner and approved for sharing. That is, video, audio, and/or text may be shared with other users only when requested by the owner and approved for sharing. In some embodiments, the second client device may be associated with a second A/V recording and communication device, which may be located in the first neighborhood, or in another (second) neighborhood. However, in other embodiments, the second client device may not be associated with any A/V recording and communication device. In many embodiments, various users may access and interact with a particular neighborhood by using a client application running on a client device, as further described below.

In reference to FIG. 11, the system 1000 may include one or more first audio/video (A/V) recording and communication device(s) 1002 associated with a first neighborhood. In many embodiments, the first A/V recording and communication device(s) 1002 may be configured to access a first user's network 1008 to connect to a network (Internet/PSTN) 1010. The system 1000 may also include one or more first client device(s) 1004, which in various embodiments may be configured to be in network communication with the first A/V recording and communication device 1002. The first client device 1004 may comprise, for example, a mobile phone such as a smartphone, or a computing device such as a tablet computer, a laptop computer, a desktop computer, etc. The first client device 1004 may include any or all of the components and/or functionality of the client devices 114, 800 described herein. In some embodiments, the first client device 1004 may not be associated with a first A/V recording and communication device.

In various embodiments, the system 1000 may also include one or more second client device(s) 1014 associated with the first neighborhood. The second client device(s) 1014 may connect to the network (Internet/PSTN) 1010 using a second user's network 1012. The second client device 1014 may comprise, for example, a mobile phone such as a smartphone, or a computing device such as a tablet computer, a laptop computer, a desktop computer, etc. The second client device 1014 may include any or all of the components and/or functionality of the client devices 114, 800 described herein. In various embodiments, the second client device 1014 may connect to the Network (Internet/PTSN) 1010 using any network such as (but not limited to) a wireless network such as a cellular/mobile network and/or a Wi-Fi network, a wired network such as an Ethernet network, a public network, a low-bandwidth network, and/or any other appropriate network to access the network (Internet/PSTN) 1010. In some embodiments, the second client device 1014 may be associated with a second A/V recording and communication device 1003, but in other embodiments the second client device 1014 may not be associated with any A/V recording and communication devices.

With further reference to FIG. 11, the system 1000 may also include various backend devices such as (but not limited to) storage devices 1032, servers 1030, and APIs 1028 in network communication with the A/V communication devices 1002, 1003 and/or the client devices 1004, 1014. In many embodiments, the various backend devices 1028, 1030, 1032 may be configured to access a network 1034 to connect to the network (Internet/PSTN) 1010. The servers 1030 may be configured to receive a share signal from the first client device(s) 1004, as described above. In many embodiments, the servers 1030 may be configured to verify a user for access to a neighborhood and provide neighborhood features. For example, the server 1030 may be in network communication with a third-party verification service 1018 to verify the second user using the second client device 1014, particularly when the second client device 1014 is not associated with any A/V recording and communication devices. Further, the server 1030 may be in network communication with a third-party content source server to provide news items, crime information, etc., as further described below. In some embodiments, the third-party verification service 1018 may be in network communication with the second client device 1014 to verify the second user, as further described below. In many embodiments, the third-party verification service 1018 may be configured to access third-party networks 1016 to connect to the network (Internet/PSTN) 1010. In some embodiments, the storage devices 1032 may be a separate device from the servers 1030 (as illustrated) or may be an integral component of the servers 1030.

Figure 12:
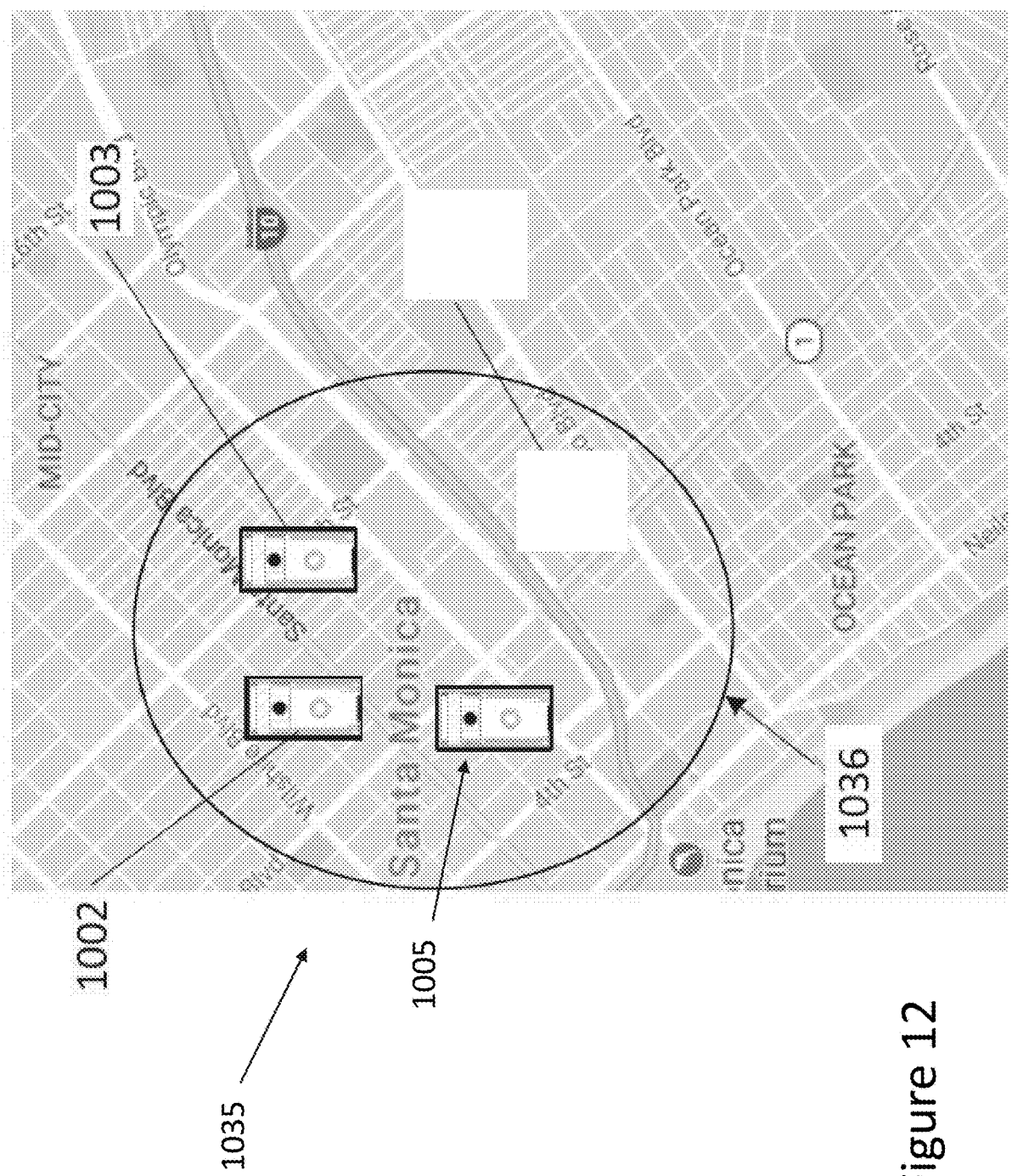
FIG. 12 is a screenshot of a map illustrating a neighborhood according to an aspect of the present disclosure.

FIG. 12 is a screenshot of a map 1035 illustrating an example neighborhood 1036, identified as Santa Monica, Calif., according to an aspect of the present disclosure. The neighborhood 1036 may include one or more A/V recording and communication devices, 1002, 1003, 1005, each of which may be associated with at least one respective client device. For example, the first A/V recording and communication device 1002 may be associated with the first client device 1004, the second A/V recording and communication device 1003 may be associated with the second client device 1014, and the third A/V recording and communication device 1005 may be associated with a third client device (not shown). The user may operate the client device (e.g., the client device 1004, 1014) to share video footage captured by their respective A/V recording and communication device(s)

(e.g., the A/V recording and communication devices 1002, 1003, 1005), and when the shared video is approved (e.g., by an administrator and/or intelligence of the system 1000), the shared video footage may be received by the other client devices associated with the neighborhood 1036.

Although a specific neighborhood 1036 is discussed above with respect to FIG. 11 and shown in FIG. 12, a neighborhood may comprise any number of differing characteristics such as (but not limited to) specific location, size of the geographical location, groupings of A/V recording and communication devices, groupings of third-party devices, and/or relative locations of the neighborhoods to each other in accordance with various aspects of the present disclosure. In various embodiments, one or more of the neighborhoods may be coextensive with the boundaries of a community, municipality, town, village, city, county, etc. Similarly, one or more of the neighborhoods may not be coextensive with the boundaries of a community, municipality, town, village, city, county, etc., and/or may overlap with at least parts of multiple communities, municipalities, towns, villages, cities, counties, etc.

Figure 13:
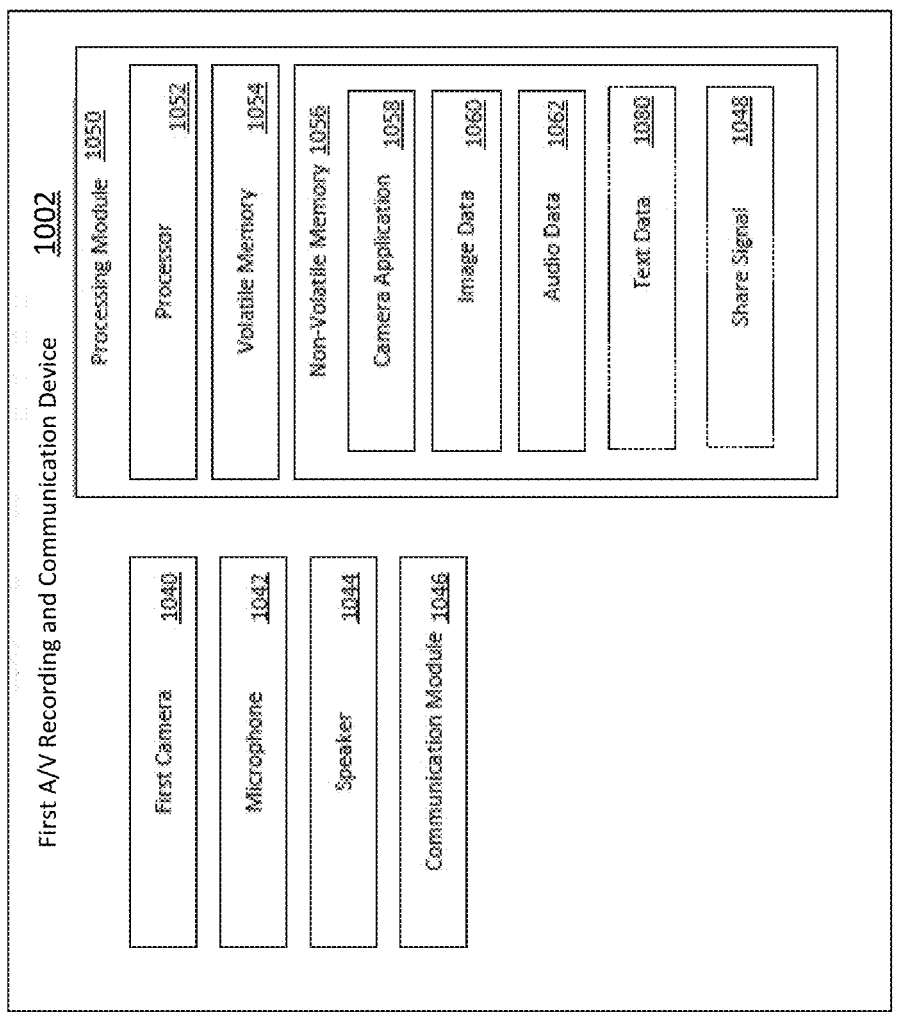
FIG. 13 is a functional block diagram illustrating one embodiment of an A/V recording and communication device according to various aspects of the present disclosure.

FIG. 13 is a functional block diagram illustrating an embodiment of the first A/V recording and communication device 1002 according to various aspects of the present disclosure. The second and third A/V recording and communication devices 1003, 1005 may, in various embodiments, be similar in structure and/or function to the first A/V recording and communication device 1002 illustrated in FIG. 13. The first A/V recording and communication device 1002 may comprise a processing module 1050 that is operatively connected to a camera 1040, a microphone 1042, a speaker 1044, and a communication module 1046. The processing module 1050 may comprise a processor 1052, volatile memory 1054, and non-volatile memory 1056 that includes a camera application 1058. In various embodiments, the camera application 1058 may configure the processor 1052 to capture image data 1060 using the camera 1040 and audio data 1062 using the microphone 1042. In some embodiments, the camera application 1058 may also configure the processor 1052 to generate text data 1080, such as metadata, describing the image data 1060 to the first client device 1004. In addition, the camera application 1058 may configure the processor 1052 to transmit the image data 1060, the audio data 1062, and/or the text data 1080 to the first client device 1004 using the communication module 1046. In some embodiments, the first client device 1004 may generate and transmit a share signal 1048 using the image data 1060, the audio data 1062, and/or the text data 1080 to the server 1030. In other embodiments, the camera application 1058 may configure the processor 1052 to directly generate and transmit a share signal 1048 using the image data 1060, the audio data 1062, and/or the text data 1080 to the server 1030 using the communication module 1046. As further described below, the share signal 1048 may be received by the server 1030, where it may be provided to members of a neighborhood using client devices such as (but not limited to) the second client device 1014.

Figure 14:
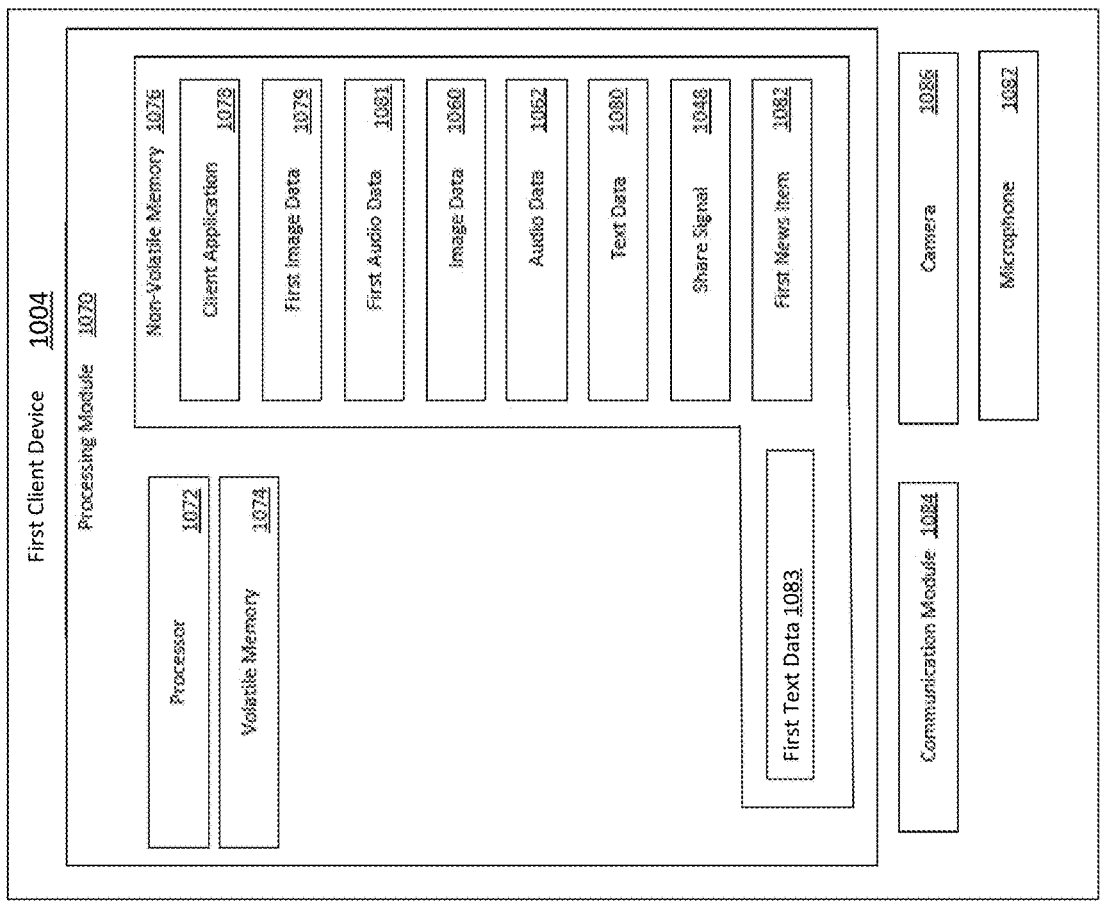
FIG. 14 is a functional block diagram illustrating one embodiment of a client device according to various aspects of the present disclosure.

FIG. 14 is a functional block diagram illustrating one embodiment of the first client device 1004 according to various aspects of the present disclosure. The second client device 1014 may, in various embodiments, be similar in structure and/or function to the first client device 1004 illustrated in FIG. 14. The first client device 1004 may be configured to share video footage captured by the first A/V recording and communication device 1002 using a share signal 1048. The first client device 1004 may include a processing module 1070 that is operatively connected to a camera 1086 and a microphone 1087. The processing module 1070 may comprise a processor 1072, volatile memory 1074, and non-volatile memory 1076. The non-volatile memory 1076 may include a client application 1078 that configures the processor 1072 to capture first image data 1079 using the camera 1086 and first audio data 1081 using the microphone 1087. The first client device 1004 may also include a communication module 1084 for network communication with the first A/V recording and communication device 1002 and/or the server 1030. In some embodiments, the first client device 1004 may receive the image data 1060 and the audio data 1062 captured by the first A/V recording and communication device 1002, as described above. Further, the first client device 1004 may be configured to receive first text data 1083 input by a first user that describes the image data 1060 and/or the audio data 1062. In various embodiments, the share signal 1048 may include the image data 1060, the first image data 1079, the audio data 1062, the first audio data 1081, the text data 1080, and/or the first text data 1083. Further, the client device 1004 may transmit the share signal 1048 to the server 1030, where the contents of the share signal may be provided to members of a neighborhood using client devices such as (but not limited to) the second client device 1014. In addition, the client application 1078 may configure the processor 1072 to provide the user of the first client device 1004 with various neighborhood features using graphical user interfaces (GUIs), as further described below.

In reference to FIGS. 13 and 14, the image data 1060, 1079 may comprise image sensor data such as (but not limited to) exposure values and data regarding pixel values for a particular sized grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments. In addition, a communication module, such as the communication modules 1046, 1084 may comprise (but is not limited to) one or more transceivers and/or wireless antennas (not shown) configured to transmit and receive wireless signals. In further embodiments, the communication modules 1046, 1084 may comprise (but are not limited to) one or more transceivers configured to transmit and receive wired and/or wireless signals.

Figure 15:
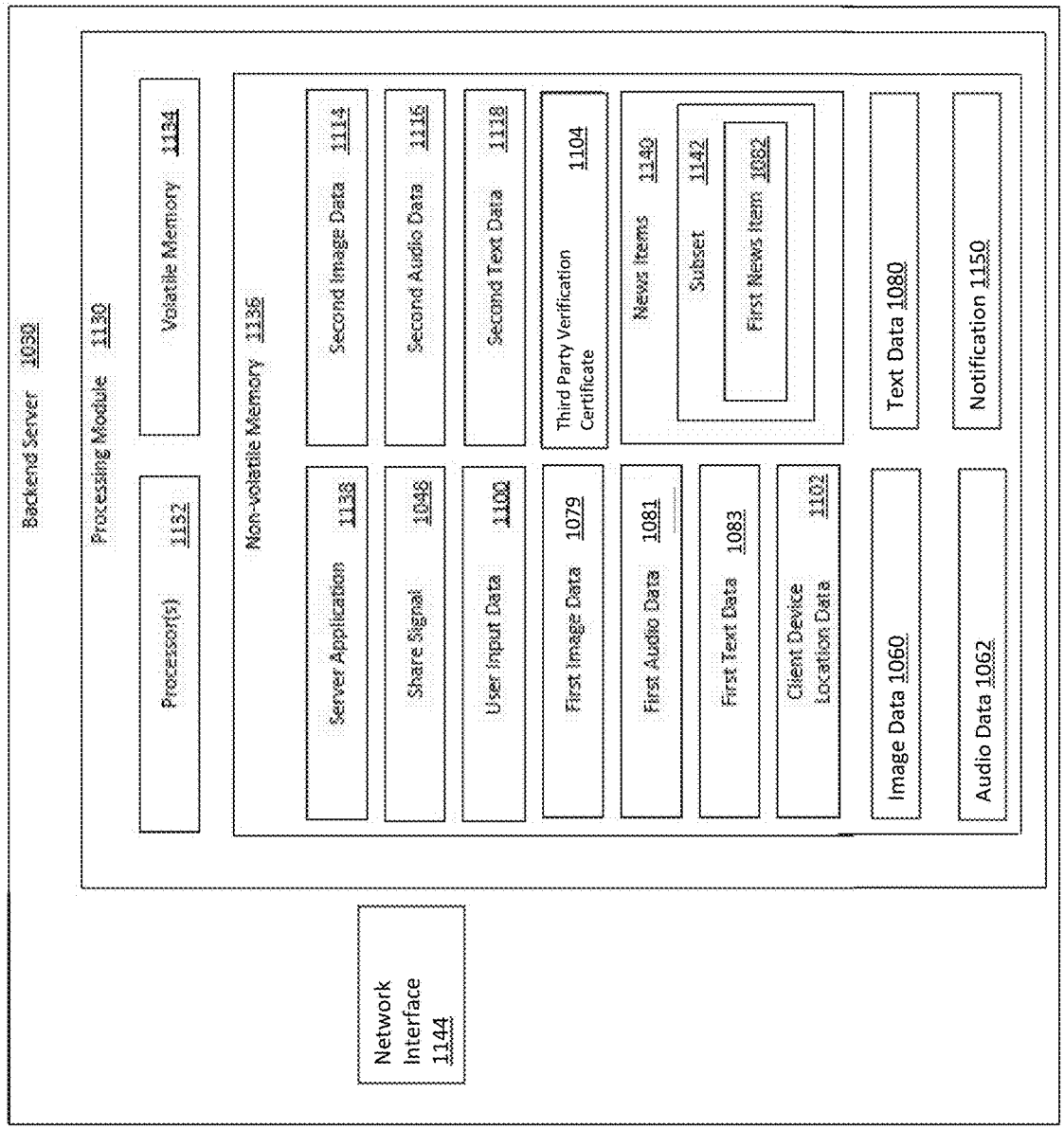
FIG. 15 is a functional block diagram illustrating one embodiment of a backend device according to various aspects of the present disclosure.

FIG. 15 is a functional block diagram illustrating one embodiment of the server 1030 according to various aspects of the present disclosure. The server 1030 may comprise a processing module 1130 comprising a processor 1132, volatile memory 1134, and non-volatile memory 1136. The processor 1132 may be operatively connected to a network interface 1144 that may allow the server 1030 to access and communicate with devices connected to the network (Internet/PSTN) 1010 associated with one or more neighborhoods, as described above. For example, the non-volatile memory 1136 may include a server application 1138 that configures the processor 1132 to receive the share signal 1048 that may include the image data 1060, the audio data 1062, and/or the text data 1080, from first client device 1004 the first A/V recording and communication device 1002 located in the first neighborhood 1036. In some embodiments, the server may receive the first image data 1079, the first audio data 1081, and/or the first text data 1083 from the first client device 1004. In various embodiments, the server application 1138 may also configure the processor 1132 to receive second image data 1114, second audio data 1116, and/or second text data 1118 from another client device, such as, but not limited to, the second client device 1014.

In reference to FIG. 15, the server 1030 may be configured to verify a user and/or provide neighborhood features to members of a neighborhood. For example, the server 1030 may be configured to verify a user using a third-party verification certificate 1104. In a further example, the server 1030 may be configured to provide third-party content to a member of the neighborhood using a plurality of news items 1140 that may include a subset 1142 and a first news item 1082. In addition, the server 1040 may provide members of a neighborhood with video captured by A/V recording and communication devices and/or client devices located within the neighborhood.

In further reference to FIG. 15, the non-volatile memory 1136 may also include client device location data 1102 that may be used to determine the locations of the client devices 1004, 1014. In some embodiments, the share signal 1048 may include the location data and a command to share the image data 1060 and/or the first image data 1079 with a network of users. In some embodiments, the command to share the image data 1060 and/or the first image data 1079 with the network of users may include a command to share the image data 1060 and/or the first image data 1079 only with one neighborhood of a plurality of neighborhoods. In other embodiments, the command to share the image data 1060 and/or the first image data 1079 with the network of users may include a command to share the image data 1060 and/or the first image data 1079 with the plurality of neighborhoods.

In the illustrated embodiment of FIGS. 13-15, the various components including (but not limited to) the processing modules 1050, 1070, 1130, the communication modules 1046, 1084, and the network interface 1144 are represented by separate boxes. The graphical representations depicted in each of FIGS. 13-15 are, however, merely examples, and are not intended to indicate that any of the various components of the first A/V recording and communication device 1002 the first client device 1004, or the server 1030 are necessarily physically separate from one another, although in some embodiments they might be. In other embodiments, however, the structure and/or functionality of any or all of the components of first A/V recording and communication device 1002 may be combined. In addition, in some embodiments the communication module 1046 may include its own processor, volatile memory, and/or non-volatile memory. Likewise, the structure and/or functionality of any or all of the components of the client device 1004 may be combined. In addition, in some embodiments the communication module 1084 may include its own processor, volatile memory, and/or non-volatile memory. Further, the structure and/or functionality of any or all of the components of the server 1030 may be combined. In addition, in some embodiments the network interface 1144 may include its own processor, volatile memory, and/or non-volatile memory.

As described, the client application 1078 may configure the processor 1072 to provide the user of the first client device 1004 with various neighborhood features using graphical user interfaces (GUIs). In accordance with one aspect of the present embodiments, the client application 1078 configures the processor 1072 to provide the user of the first client device 1004 with an augmented reality display including crime location information from audio/video (A/V) recording and communication devices and/or from other data sources, as well as with an interface for reporting crime and other information with respect to the neighborhood (or other area). Providing a user with such a tool as the user walks through a neighborhood (or other area) advantageously enhances the user's neighborhood watch experience and thus engages the user with the community and helps create a feeling of interest and connectedness to the community.

Figure 16:
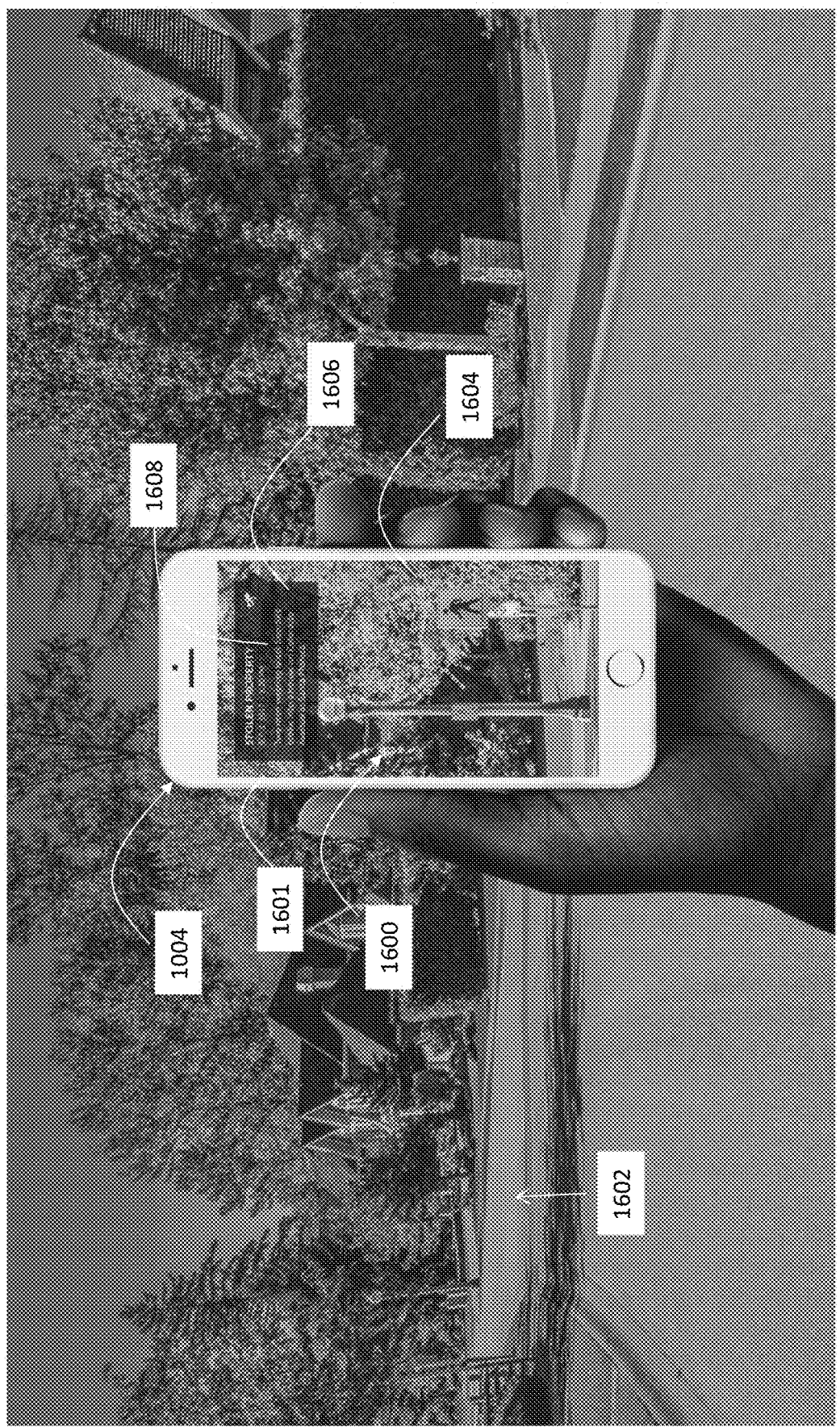
FIG. 16 is an example augmented reality graphical display provided by a client device according to one aspect of the present disclosure.

In one example embodiment, as illustrated in FIG. 16, the client application 1078 of FIG. 14 provides an augmented reality graphical display 1600, on the display 1601 of the first client device 1004, to inform a user of crime information as the user moves through the neighborhood 1602. Thus, the user is informed, in a real time and visual manner, where crimes in the neighborhood have occurred. In particular, as the user walks through the neighborhood 1602, the user points the camera 1086 of the first client device 1004 toward a general location in the neighborhood, such as forward or to the right, for example. The user may also point the camera 1086 of the first client device 1004 toward a specific landmark in the neighborhood, such a home or a street lamp, for example. The view 1604 or scene of the neighborhood 1602 captured by the camera 1086 is presented live and in real time by the augmented reality graphical display 1600 to the user on the display 1601 of the first client device 1004. In some embodiments, as the user moves, the first client device 1004 and the focus of the camera 1086 changes, the neighborhood view 1604 presented to the user via the augmented reality graphical display 1600 also changes in real time in order to correspond to the general location or landmark pointed to by the camera 1086. For convenience, the example illustrated in FIG. 16 shows the first client device 1004. The present embodiments, however, are not limited to the first client device 1004, and may be practiced by any user with any client device, including the second client device 1014.

In addition to the neighborhood view 1604 presented to the user via the augmented reality graphical display 1600, the client application 1078 also identifies and presents to the user crime location information 1606 that corresponds to the neighborhood view 1604. In particular, the client application 1078 overlays the crime location information 1606 over the top of the neighborhood view 1604 to create a seamless augmented reality view of the neighborhood 1602. In some embodiments, the client application 1078 identifies the crime location information in real time as the focus of the camera 1086 changes and updates the augmented reality graphical display 1600 in real time accordingly. This feature enables a user to review crime location information in real time, as it directly relates to the current location of the user, while the user is walking through the neighborhood 1602. For example, when a user approaches a particular home on a particular street in a particular neighborhood, and points the camera 1086 of the first client device 1004 at the home, the client application 1078 may identify, for example, that the home was burglarized in the past and present that information to the user via the augmented reality graphical display 1600 by overlaying the crime location information 1606 of the past burglary over the top of the real time live neighborhood view 1604.

The crime location information 1606 may include a text description 1608 of the crime, as illustrated in FIG. 16. The text description may include, for example, at least one of a category or type of the crime ("stolen property" in the example of FIG. 16), a description of the crime, the address where the crime occurred, the date the crime occurred, and the distance to the location of the crime from the current position of the first client device 1004. The crime location information 1606 may also be presented in other forms, however. For example, the crime location information 1606 may include an image (not shown), which may include an image of the crime scene or an image of the crime perpetrator, for example. The crime location information 1606 may also include a video (not shown), which may include actual recorded video of the crime as it happened, for example. The video may also include a video report of the crime as reported by local media, for example. In other examples, the crime location information 1606 may include links to data sources where further information may be obtained about the identified crime. For example, the crime location information 1606 may include a link to a news article and/or a link to a police report.

The client application 1078 may retrieve the crime location information 1606 from various sources. That is, the crime location information 1606 is not necessarily stored in a database of a single server, and may be retrieved from multiple sources. For example, the client application 1078 may retrieve audio/video footage of crimes as they happened from the server 1030 that were generated by the A/V recording and communication devices 1002, 1003, 1004 and uploaded/shared by the respective users. Alternatively (or in addition), the crime location information 1606 may be retrieved from other third-party sources, such a police database of crime information, public news and media databases, or other similar databases or archives containing crime location information. In one example, the crime location information 1606 may be user-generated and retrieved from the server 1030 or another third-party data source. For example, when a user sees a crime taking place, the user may document the occurrence in the form of a text description, an image of the crime scene, and/or a video recording of the crime scene, and report it to the server 1030, to the police, to a media/news outlet, and/or to another data source from which the client application 1078 may later retrieve such information, when that information is approved for publication and/or sharing by the administrator of the system 1000.

In some embodiments, the client application 1078 identifies the crime location information 1606 by first determining the current location of the user's first client device 1004 and then identifying corresponding crime location information, from one or more of the data sources described, that is associated with the determined location. Thus, it is assumed that the crime location information 1606 retrieved from the one or more sources includes appropriate information that enables association with a specific location. For example, the crime location information 1606 may include a specific address, city, street, GNSS (global navigation satellite system) (e.g., GPS) coordinates, or a landmark name, for example, against which the client application 1078 may cross-reference with the determined current location of the first client device 1004.

In some embodiments, the client application 1078 may identify the current location of the first client device 1004 by using the GNSS (e.g., GPS) location of the first client device 1004, assuming location services (or a similar type of service for determining a GNSS location of a mobile computing device) is enabled on the first client device 1004. In another example, the client application 1078 may also determine the orientation of the mobile first client device 1004 in order to better identify corresponding crime location information. For example, a user may be currently standing at a specific GNSS location on a particular street in a neighborhood where two different crimes have occurred, one on a first side of the street at a first home and one on a second side of the same street at a second home. By determining whether the first client device 1004 is facing the first home on the first side of the street or the second home on the second side of the street at the given GNSS location, the client application 1078 may determine which of the two instances of crime location information to present to the user. In one example, if the first client device 1004 is determined to be facing a direction between the two homes, the client application 1078 may determine to present both crime incidents relating to both homes on both sides of the street.

The augmented reality graphical display 1600 illustrated in FIG. 16, wherein the crime location information 1606 is overlaid upon the neighborhood view 1604 near the top of the display 1600 is only one example. The crime location information 1606 may be overlaid in different suitable positions and/or formats. For example, the crime location information 1606 may be positioned near the bottom of the display 1600 or on either side of the display 1600. In one example, a user may specify the layout of the display 1600 via a setting (not shown) and specify where and how to overlay the crime location information 1606. In one example, the level of transparency of the crime location information 1606 may be adjusted. In another example, a user may specify, via settings, the level of detail of crime location information 1606 to be displayed. For example, displayed crime location information 1606 may include a category or type of the crime without further description, or it may include a brief description as well (or instead of the category or type of the crime). In one example, selecting (e.g., by clicking on or touching) the crime location information 1606 may provide additional information and/or detail, either in the same augmented reality graphical display 1600 or in a new display (not shown).

In one example, the client application 1078 enables a user to add comments relating to the crime location information 1606, which can be stored by the data source from which the crime location was retrieved and/or by the server 1030 to be shared with other users. In some embodiments, the comments may be reviewed by the administrator at the server 1030 and only shared with other users when the comment is determined appropriate for sharing. For example, the client application 1078 may determine that a car was previously stolen from a current location of the first client device 1004, and display corresponding crime location information 1606 to a user in the augmented reality graphical display 1600. However, the user may be familiar with the current location from personal experience, for example, and feel very safe in the location despite the previous occurrence of the crime. In order to share such information with other future users passing through the neighborhood, the client application 1078 may enable the user to comment accordingly and then to display such comments, once approved (in some embodiments), to other users at the same location in the future, in combination with the retrieved crime location information. Such a feature may further encourage community engagement. In one example, the user comment feature may be either enabled or disabled via setting (not shown).

Figure 17:
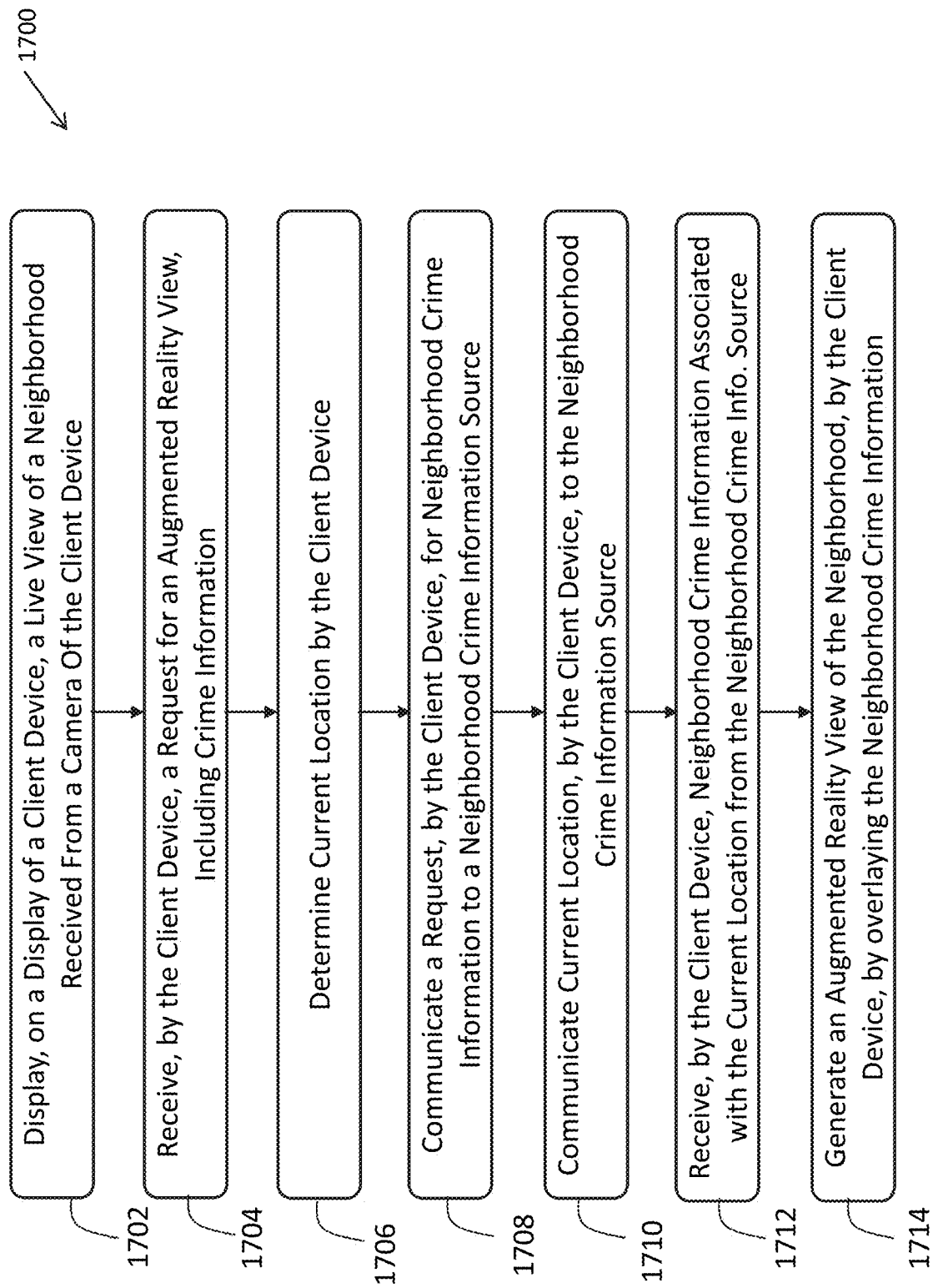
FIG. 17 is a flowchart illustrating a process for displaying crime information associated with a neighborhood according to one aspect of the present disclosure.
Figure 18:
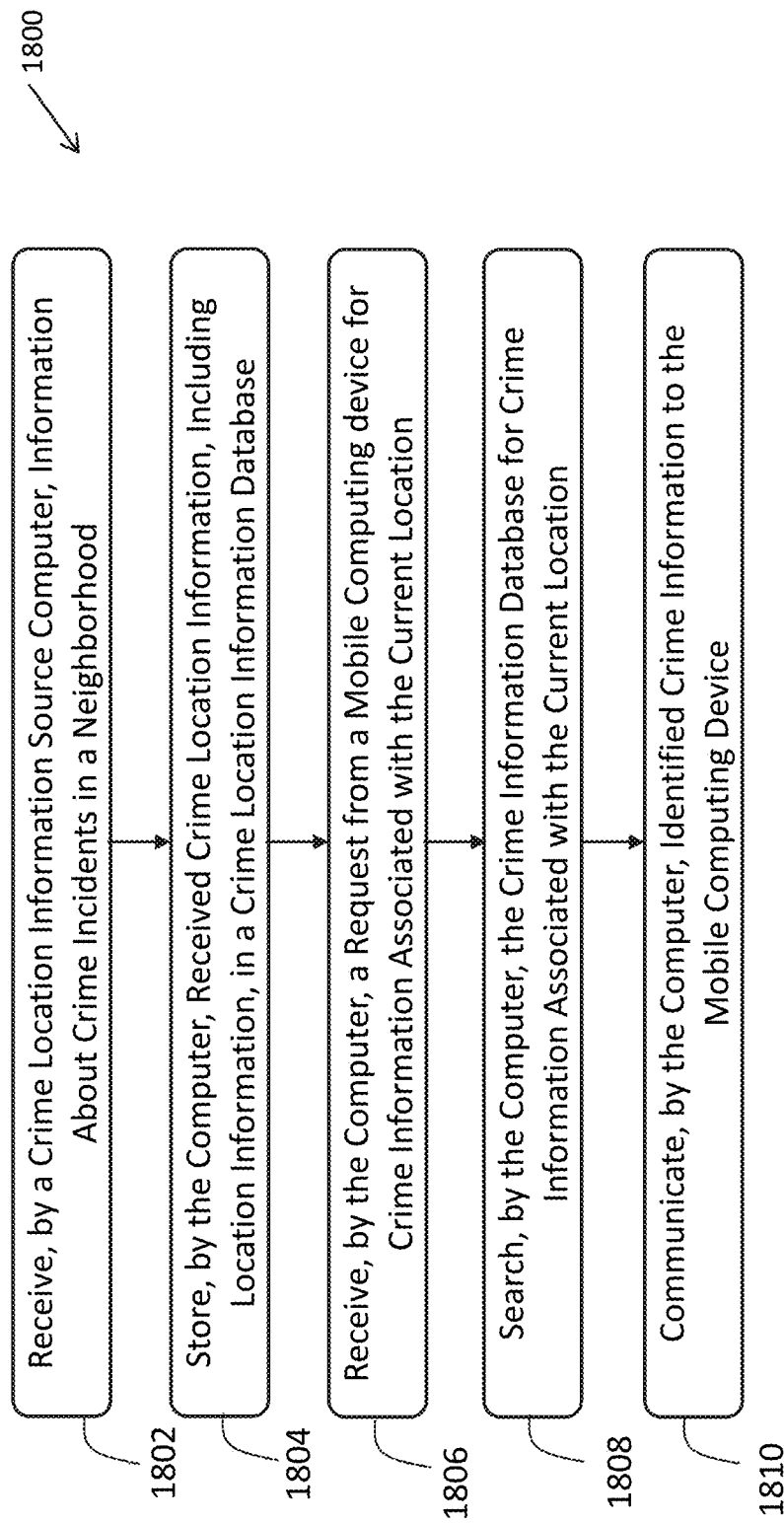
FIG. 18 is a flowchart illustrating a process for communicating crime information associated with a neighborhood according to one aspect of the present disclosure.

The example embodiment illustrated in FIG. 16 and described above will be further understood with reference to the flowcharts illustrated in FIGS. 17 and 18. FIG. 17 is a flowchart illustrating an example method 1700 for displaying crime information associated with a neighborhood. At block 1702, a mobile computing device, such as the first client device 1004, displays a live view 1604 of a neighborhood 1602, received from the camera 1086 of the first client device 1004, on the display 1601 of the first client device 1004. In one example, the live view 1604 is updated automatically in real time to correspond to a current focus of the camera 1086 as a user moves through the neighborhood 1602 and the location and position of the camera 1086 changes.

At block 1704, the first client device 1004 receives a request (e.g., an input or directive from a user of the client device) for an augmented reality view, including crime information, of the neighborhood. For example, the client application 1078 may provide a button or another user interface for enabling a user to request such a function or feature. In one example, the augmented reality view may be requested using a motion of the first client device 1004 and/or a voice command. For example, raising the client device 1004 and initiating a live view of a neighborhood using a camera of the client device 1004 while simultaneously speaking a phrase such as "AR Crime" may prompt the client application 1078 to initiate an augmented reality view of the neighborhood.

At block 1706, the first client device 1004 determines a current location of the first client device 1004. The current location may be determined, for example, based on a GNSS (e.g., GPS) location of the first client device 1004, or a detected orientation and angle of view of the first client device 1004, or a combination of both GNSS location as well as orientation and angle of view.

At block 1708, the first client device 1004 communicates a request, using the communication module 1084, for neighborhood crime information, to a neighborhood crime information source computing device. For example, the request may be sent to the server 1030. In another example, the request may be sent to a police report database, a news/media outlet database, and/or to another third-party database comprising neighborhood crime information. At block 1710, the first client device 1004 also communicates the determined current location of the first client device 1004 to the neighborhood crime information source computing device.

At block 1712, the first client device 1004 receives, from the neighborhood crime information data source, neighborhood crime information associated with the determined current location of the first client device 1004. The neighborhood crime information may be received in the form of, for example, text, an image, a video, audio, a link to additional information, or any combination thereof.

At block 1714, the first client device 1004 generates an augmented reality view 1600 of the neighborhood 1602 by overlaying the neighborhood crime location information 1606 upon the live view 1604 of the neighborhood 1602 on the display 1601 of the first client device 1004. In one example, the augmented reality view 1600 is generated based on user-specified settings that define the layout, appearance, and level of information presented, as described above.

FIG. 30 is a flowchart illustrating one example method 3000 for displaying safety information associated with a street in a neighborhood (or any other area). The method 3000 may be implemented in the client application 1078 of the client device 1004 and/or the client device 1014, for example, and is similar to the method 1700 of FIG. 17, but illustrates the user interacting with the client application 1078 before the live view is captured and displayed.

At block 3002, a mobile computing device, such as the first client device 1004 or the second client device 1014, receives an input directing the client device to display crime information for a street in a neighborhood. In one example of block 3002, the client application 1078 receives an input from the user instructing the client application 1078 to display crime location information 1606 for a street on which the user of the client device is currently located. In block 3004, a current location of the client device is determined. In one example of block 3004, the client application 1078 controls the first client device 1004 to determine a current location of the client device using GNSS (e.g., GPS). In block 3006, the client device retrieves crime location information corresponding to the current location from at least one server. In one example of block 3006, the client application 1078 sends a message including the current location to the neighborhood crime information source (e.g., the server 1030), and receives, in response, a message including the crime location information 1606 corresponding to the current location.

In block 3008, the camera of the client device is activated to capture a live view of the current location. In one example of block 3008, the client application 1078 activates the camera 1086 to capture a live view of a street at the current location of the client device 1004. In block 3010, the live view is displayed on a display of the client device. In one example of block 3010, the client application 1078 displays the first image data 1079 on the display of the client device 1004 as it is captured by the camera 1086.

In block 3012, an augmented reality view of the location is generated by including an indication of the crime location information 1606 in the live view. In one example of block 3012, the client application 1078 generates the augmented reality graphical display 1600 to include the crime location information 1606 and/or a summary of the crime information including an indication of whether the street is considered safe or unsafe.

Blocks 3004, 3006, 3010, and 3012 may repeat at intervals to update the augmented reality graphical display 1600 as the client device 1004 changes orientation and/or location (e.g., as the user moves).

FIG. 18 is a flowchart illustrating an example method 1800 for communicating information associated with a neighborhood. At block 1802, a computer serving as a source of crime location information receives information about crime incidents in a neighborhood. The computer may be, for example, the server 1030, a police crime computer database, a news/media computer database, or another third-party computer database. The crime incident information received may be, for example, automatically generated by an A/V recording and communication device 1002, 1003, 1004, or may be user-generated. The received crime information also includes information identifying the location of occurrence of the crime incidents.

At block 1804, the computer stores the received crime location information and the associated location information in a crime location information database. In one example, the crime location information database may be publicly accessible. In another example, the crime location information database may be secured and only accessible by authorized users. In a still further example, the crime location information database may be modified and/or appended to by either the public or by authorized users.

At block 1806, the computer receives a request from a mobile computing device, such as the first client device 1004, for crime information associated with the current location of the mobile computing device. The current location may include a GNSS location, or a street address, for example, as described above.

At block 1808, the computer searches the crime information database for crime information associated with the current location of the mobile computing device. In one example, the computer may search multiple crime information databases, such as the server 1030 database, a police crime information database, a news/media outlet database, and/or any other third-party database that includes crime location information.

At bock 1810, after the computer identifies crime information associated with the current location of the mobile computing device in at least one crime location information database, the computer communicates the identified crime location information to the mobile computing device. In one example, in order to improve speed and conserve network bandwidth, the computer may initially communicate a portion of the identified crime information to the mobile computing device, and then subsequently communicate the remainder of the information in response to a second request from the mobile computing device for additional information.

Figure 19:
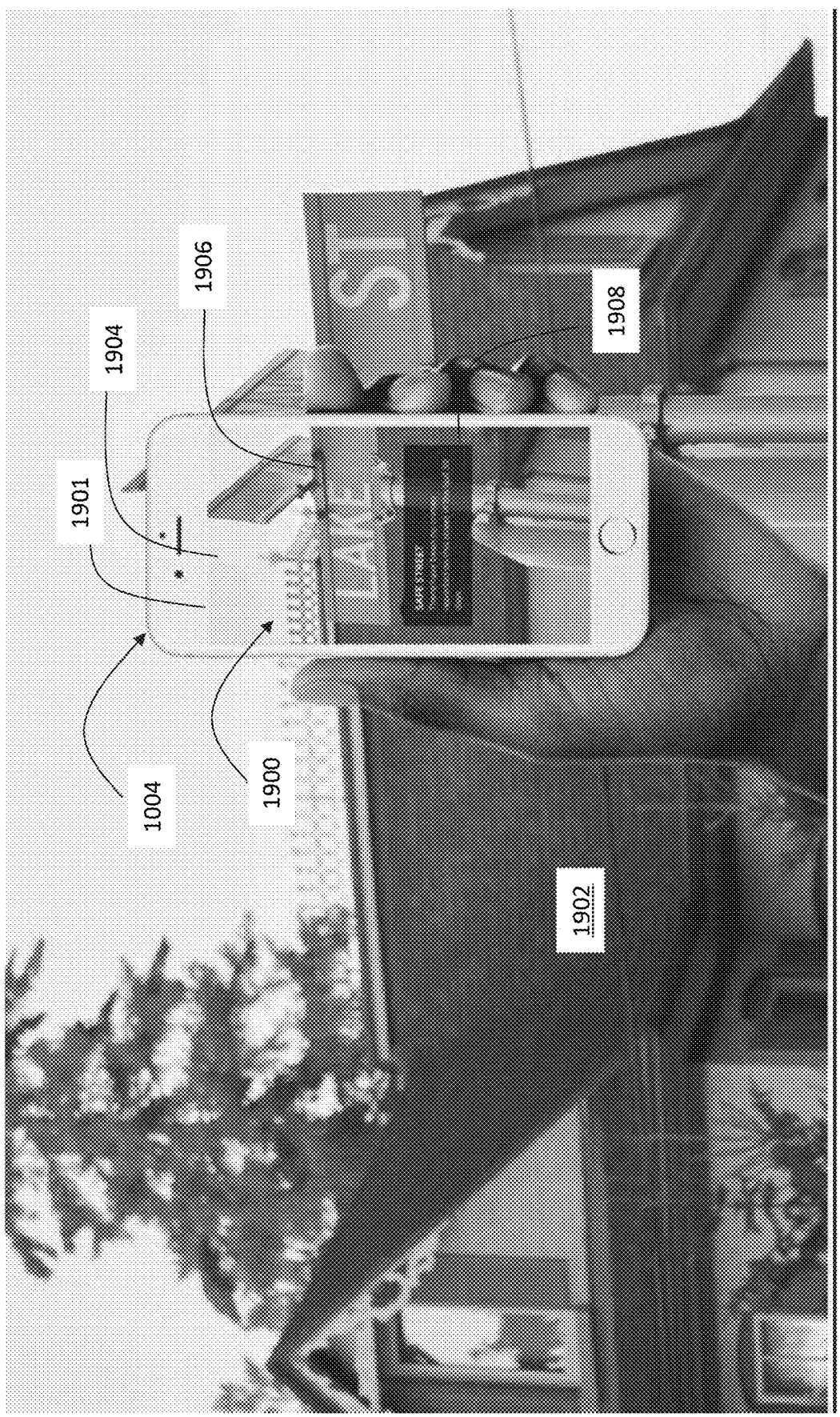
FIG. 19 is another example augmented reality graphical display provided by a client device according to one aspect of the present disclosure.

In another example embodiment, as illustrated in FIG. 19, the client application 1078 of FIG. 14 generates an augmented reality view 1900 of the neighborhood 1902 on the display 1901 of the first client device 1004 in order to help a user feel safer while the user moves through a neighborhood. In particular, the client application informs the user of what streets have less crime and thus are safer than others, therefore directing the user to a safer path through the neighborhood. In particular, as the user walks through a neighborhood 1902, the user points the camera 1086 of the first client device 1004 toward a general location in the neighborhood, such as forward or to the right, for example. The view 1904 or scene of the neighborhood 1902 captured by the camera 1086 is presented live and in real time by the augmented reality graphical display 1900 to the user via the display 1901 of the first client device 1004. As the user moves, the location of the first client device 1004 and the focus of the camera 1086 change, and the neighborhood view 1904 presented to the user via the augmented reality graphical display 1900 may also change in real time in order to correspond to the general location and/or landmark pointed to by the camera 1086.

In addition to the neighborhood view 1904 presented to the user via the augmented reality graphical display 1900, the client application 1078 also identifies and presents crime and/or safety information specific to a street 1906 in the neighborhood. In particular, the client application 1078 overlays the crime and/or safety information 1908 about the street over the top of the neighborhood view 1904 to create a seamless augmented reality view of the neighborhood 1902. In order to present such information, the client application 1078 detects the presence of a street sign 1906 in the neighborhood view and analyzes the street sign 1906 to determine the name of the street. For example, the client application 1078 may extract the name of the street from the street sign 1906 using optical character recognition, computer vision, or any other technique. In some embodiments, this process may also extract block numbers from the street sign 1906, if the street sign 1906 includes that information. In one example, the client application 1078 also determines the current location of the first client device 1004 to further assist in identifying the street name.

Once the street name and/or block number 1906 are identified, the client application 1078 retrieves crime information associated with the street 1906 and generates a summary of crime information 1908 for that specific street 1906. For example, the street crime summary 1908 may include the total number of crimes associated with the street 1906 for a given time period. In another example, the street crime summary 1908 may simply include a statement as to whether the street is safe or not, based on a predefined safety threshold of what constitutes a safe street. For example, a street may be considered safe if less than 5 (or any other number of) crimes have been associated that the street within the past year (or any other length of time).

The client application 1078 provides for various settings (not shown) that enable a user to specify how the street crime summary 1908 is generated. For example, a user may define how long of a time period to factor in when determining the safety information for a street. In another example, a user may define what constitutes a crime for the purpose of determining the safety information for a street. For example, all users may consider the occurrence of a violent crime relevant for determining the safety of a street whereas not all users may consider an occurrence of a non-violent crime relevant for the purpose of determining the safety of a street. In another example, a user may define the safety threshold for what constitutes a safe street. For example, a first user may consider a street safe as long as no more than 5 crimes have been associated with the street within the past year, whereas a second user may consider a street unsafe if more than one crime has been associated with a street within the past year.

The client application 1078 may identify the crime information in real time as the focus of the camera 1086 changes and new streets are identified, and may update the augmented reality graphical display 1900 in real time accordingly. This feature enables a user to review the street crime summary 1908 in real time, as it directly relates to a current street at a current location of the first client device 1004, while the user is walking through the neighborhood 1902.

For example, when a user approaches a particular street in a particular neighborhood 1902 and points the camera 1086 of the first client device 1004 at the street sign 1906, the client application 1078 (and/or the server 1030) may identify, for example, that three crimes have occurred on that street within the past year and present that information to the user via the augmented reality graphical display 1900 by overlaying the street crime summary 1908 over the top of the real time live neighborhood view 1904.

In one example, when a user approaches an intersection and two street signs 1906 are identified in the neighborhood view 1904, the client application 1078 determines which street is safer and informs the user accordingly in the street crime summary 1908. Such a determination may be made, for example, by comparing the total number of crimes associated with each street during a user-configurable time period (e.g., one year, six months, three months, one month, one week, and so on). In one example, different types of crime may be weighted differently for the purpose of determining the relative safety of a street. For example, a violent crime may be given extra weight (e.g., a value of three) as compared to a non-violent crime (e.g., a value of one) when evaluating the relative safety of a street. Thus, for example, when the safety threshold is set to three, a street where two non-violent crimes have occurred within the past year may have a safety score of two and therefore be considered safer than a street where one violent crime has occurred within the past year with a safety score of three. The relative weights assigned to different types of crimes and/or incidents may be predefined, or may be user-defined via a setting (not shown).

That is, the client application 1078 may determine a first safety score for the first street, determine a second safety score for the second street, and then compare the first and second safety scores to determine which of the first and second streets is the safest.

In one example, clicking on or touching the street crime summary 1908 may expand the summary and provide the user with additional detail about the crime information used to generate the summary. For example, while a street crime summary 1908 may identify a street as having three associated crimes within the past year, clicking on the street crime summary 1908 may provide information about the specific crime(s) that occurred, the location(s), the date(s), etc.

The client application 1078 may retrieve crime location information for generating the street crime summary 1908 from various sources. For example, the client application 1078 may retrieve information from the server 1030, from other third-party sources such a police database of crime information, public news and media databases, and/or other similar databases or archives containing crime location information.

Figure 20:
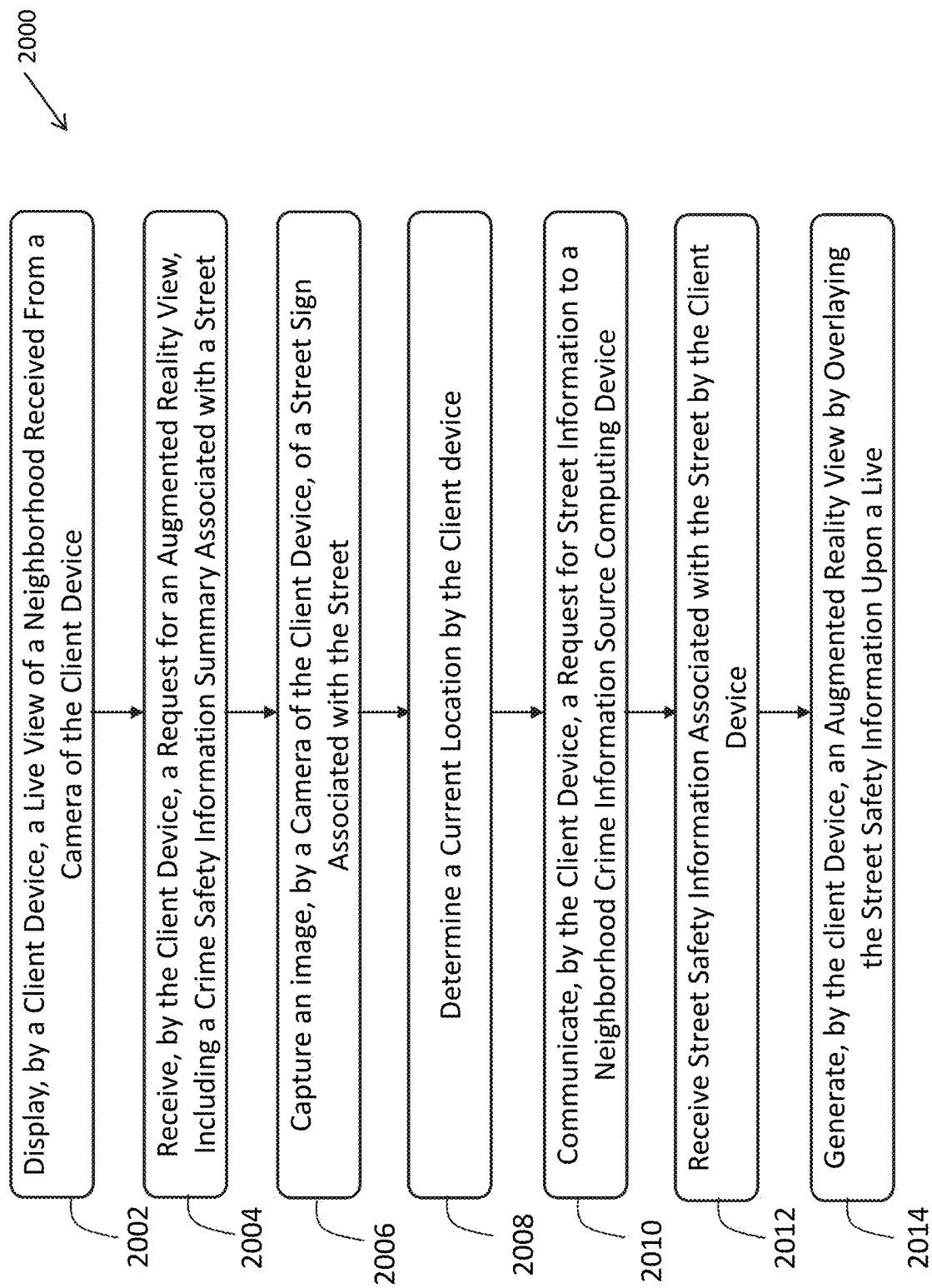
FIG. 20 is a flowchart illustrating a process for displaying safety information associated with a street according to one aspect of the present disclosure.
Figure 21:
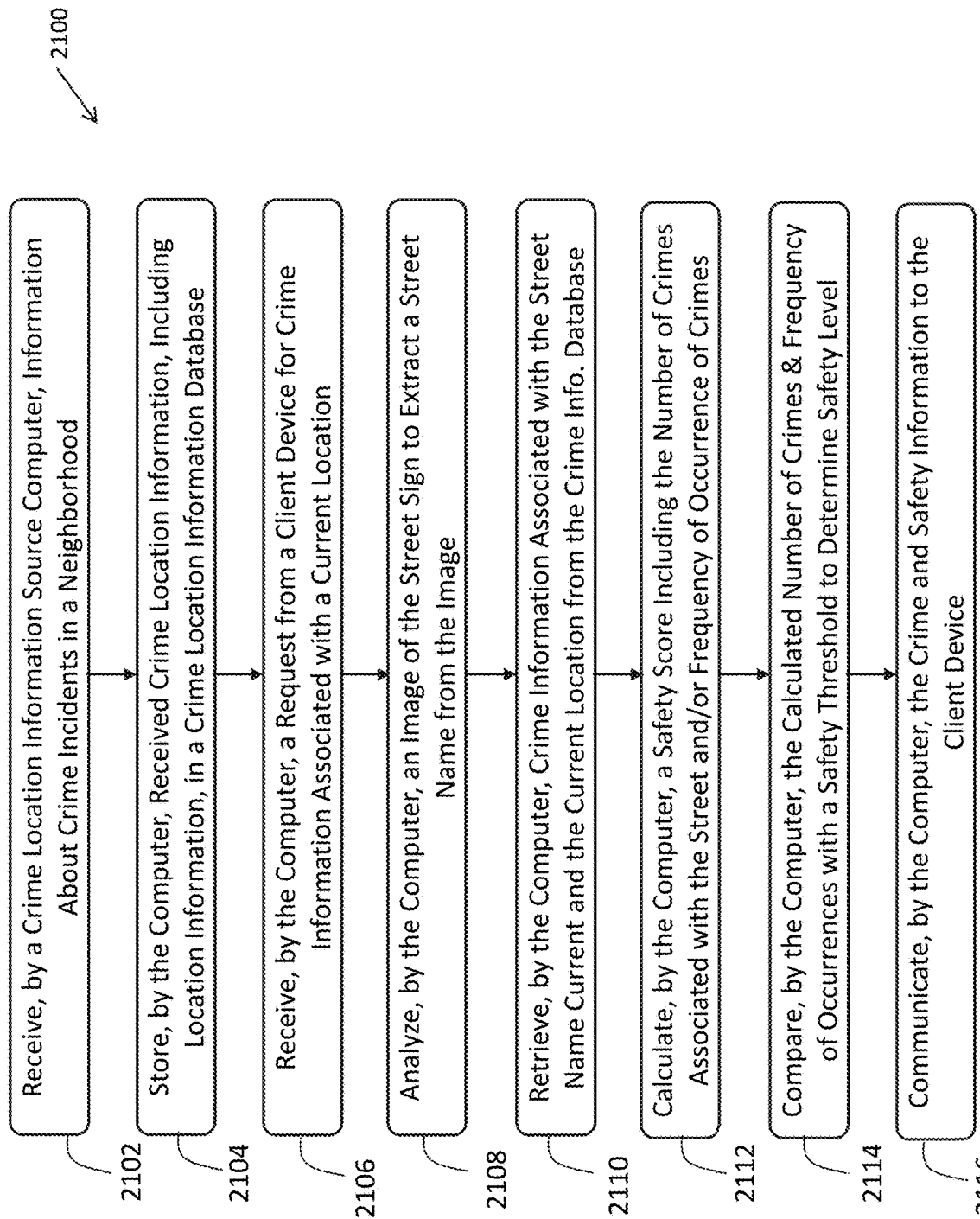
FIG. 21 is a flowchart illustrating a process for communicating safety information associated with a street according to one aspect of the present disclosure.

The example embodiment illustrated in FIG. 19 and described above will be further understood with reference to the flowcharts illustrated in FIGS. 20 and 21. FIG. 20 is a flowchart illustrating an example method 2000 for displaying safety information associated with a street in a neighborhood (or any other area). At block 2002, a mobile computing device, such as the first client device 1004, displays a live view 1904 of the neighborhood 1902, received from the camera 1086 of the first client device 1004, on the first client device 1004 display 1900. In one example, the live view 1904 is updated automatically in real time to correspond to a current point of view and focus of the camera 1086 as a user moves through the neighborhood 1902 and the location and/or the orientation of the camera 1086 change.

At block 2004, the first client device 1004 receives a request for an augmented reality view, including a crime safety information summary 1908 associated with the street in the neighborhood 1902. For example, the client application 1078 may provide a button or another user interface for enabling the user to request such a function or feature.

At block 2006, the camera 1086 of the first client device 1004 captures an image of the street sign 1906 associated with the street in the neighborhood 1902 and displays the street sign image 1906 in the displayed live view 1904.

At block 2008, the first client device 1004 determines a current location of the first client device 1004. The current location may be determined, for example, based on a GNSS location of the first client device 1004, a detected orientation and angle of view of the first client device 1004, or a combination of both GNSS location as well as orientation and angle of view.

At block 2010, the first client device 1004 communicates a request, using the communication module 1084, for street safety information, to a neighborhood crime information source computing device. For example, the request may be sent to the server 1030. In another example, the request may be sent to a police report database, a news/media outlet database, or to another third-party database comprising neighborhood crime information. In some embodiments, the request may include both the image 1906 representative of the street sign and the current location of the first client device 1004.

In one example, the client application 1078 analyzes (e.g., using computer vision or another form of image processing) the image 1906 representative of the street sign to determine the name of the street represented by the street sign. In such an example, the communicated request may include the name of the street instead of the image of the street sign, along with the current location of the first client device 1004. The current location may still be beneficial, at least since multiple streets with the same name may exist, and a current location of the client device may enable differentiation between streets having similar or identical names when determining street safety information. In another example, the safety of a given street may vary along the street, such as between different blocks on the same street, and the current location of the client device may be used to determine along which block the client device is located.

At block 2012, the client application 1078 receives street safety information associated with the identified street and/or block in the neighborhood 1902. In one example, the received safety information includes a summary of the total number of crimes identified with the street/block for a given time period. In another example, the received information includes the crime information and the client application 1078 calculates the safety information summary including the total. In one example, the client application 1078 calculates the safety information including the total based on user defined settings that specify what sorts of incidents or crimes should be used in performing the calculation.

At block 2014, the client application 1078 generates an augmented reality view 1900 of the neighborhood 1902 by overlaying the safety information summary 1908 upon the live view 1904 of the neighborhood 1902, proximate to the image of the street sign 1906, on the display 1901 of the first client device 1004. In one example, the augmented reality view 1900 is generated based on user-specified settings that define the layout, appearance, and/or level of information presented.

FIG. 21 is a flowchart illustrating an example method 2100 for communicating safety information associated with a street in a neighborhood (or any other area). At block 2102, a computer serving as a source of crime location information receives information about crime incidents in the neighborhood. The computer may be, for example, the server 1030, a police crime computer database, a news/media computer database, or another third-party computer database. The crime incident information received may be, for example, automatically generated by an A/V recording and communication device 1002, 1003, 1004, or may be user-generated. The received crime information also includes information identifying the locations of occurrence of the crime incidents, including, in at least some instances, the street name(s).

At block 2104, the computer stores the received safety/crime incident information and the associated street and location information in a crime information database. In one example, the crime location information database may be publicly accessible. In another example, the crime location information database may be secured and only accessible by authorized users. In a still further example, the crime location information database may be modified or appended to by the public and/or by authorized users.

At block 2106, the computer receives a request, from a mobile computing device such as the first client device 1004, for crime information associated with a street sign at a current location of the first client device 1004. The request includes an image of the street sign and the current location of the first client device 1004. In one example, instead of an image of the street sign, the request includes a street name extracted (e.g., by the first client device 1004) from the image.

In one example, at block 2108, if the request at block 2106 includes an image of a street sign, the computer performs an image analysis of the image of the street sign to extract a street name from the image. In one example, the image analysis performed includes optical character recognition, computer vision, etc.

At block 2110, the computer retrieves, from the crime information database, crime information associated with the received or determined street name and the current location of the first client device 1004. In one example, the computer may search multiple crime information databases, such as a database of the server 1030, a police crime information database, a news/media outlet database, and/or any other third-party database including crime location information.

In one example, at block 2112, the computer calculates, based on the search of the crime information database, a safety score including the number of crimes associated with the street and/or frequency of occurrence of crimes on the street. In one example, the computer factors in crimes and other safety-related information identified in the search based on user-defined criteria. For example, the computer may only factor into the calculation violent crimes and exclude non-violent crimes. In one example, the computer may factor in all identified crimes and safety related incidents but assign a different weight or importance to the different occurrences based on user-defined settings.

In one example, at block 2114, the computer compares the calculated number of crimes and frequency of occurrences of crimes with a safety threshold to determine a safety level of a street. For example, a street may be determined to be either "safe" or "unsafe" based on the calculation. In another example, an intermediate level of "caution" may also be assigned if the number of crimes and other safety incidents associated with a street are greater than a first safety threshold but less than a second safety threshold. In one example, the computer may receive two street names as part of the request at block 2106. In such an example, the computer may compare the calculated safety levels of each of the streets and determine which street is safer based on the calculation. A first street may be considered safer than a second street, for example, if the calculated safety score of the first street is less than the safety score of the second street.

At block 2116, the computer communicates the retrieved crime and safety information to the first client device 1004. In one example, the computer communicates a calculated safety score, a calculated safety level determination, a street safety summary, or a combination thereof.

Figure 22:
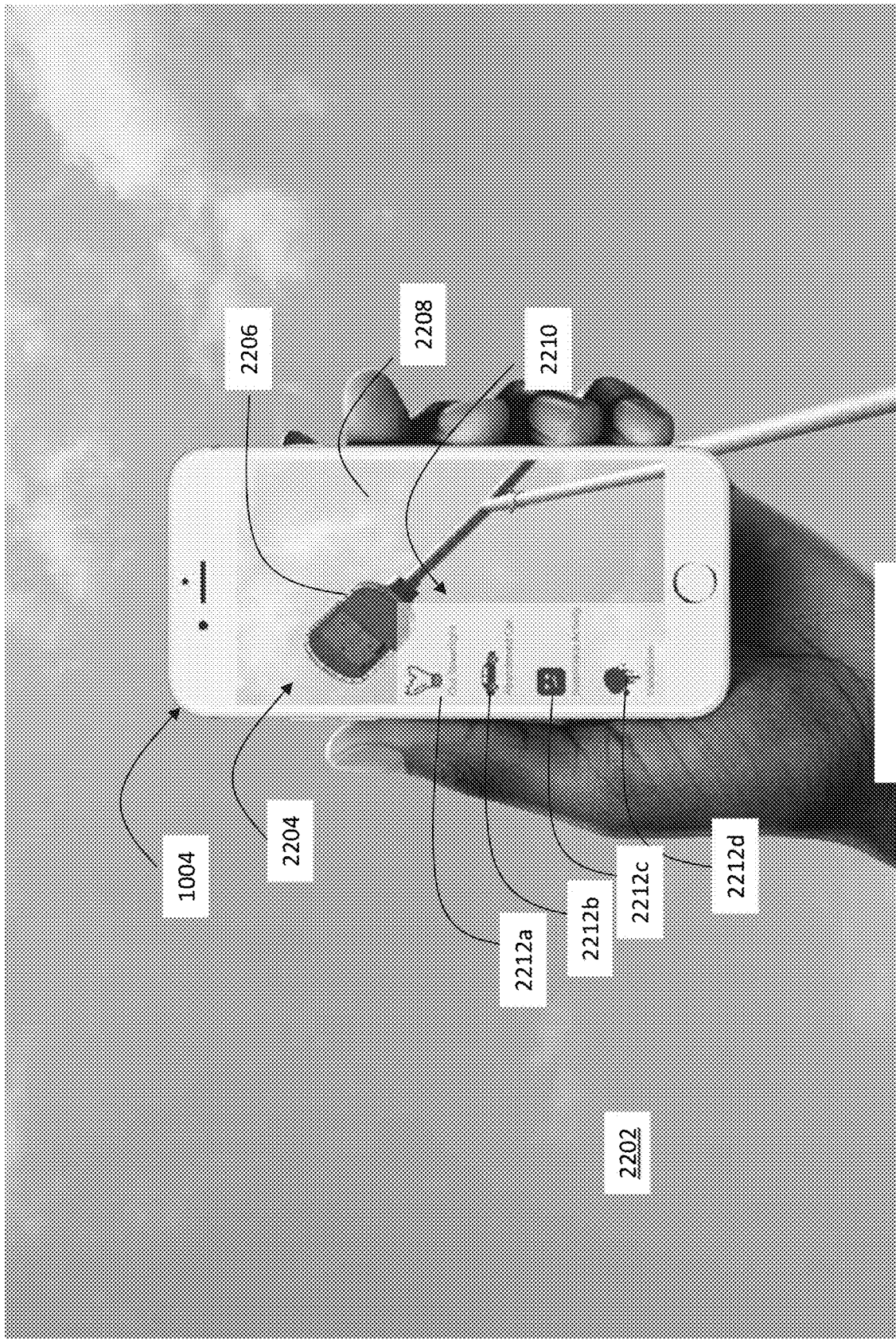
FIG. 22 is another example augmented reality graphical display provided by a client device according to one aspect of the present disclosure.

In another example embodiment, as illustrated in FIG. 22, the client application 1078 allows a user to canvas a neighborhood 2202 with the first client device 1004 and to drop visual markers, via an augmented reality view 2204, on items 2206 (and/or locations) that need repair or another form of attention. This aspect enables the user to investigate the neighborhood 2202, whether the user lives in the neighborhood, is considering moving into the neighborhood, or is just passing through, and to easily identify and report potential safety issues and/or other concerns, disturbances, etc. For example, as the user walks through the neighborhood 2202, and visually identifies something that needs repair or other attention, such as a broken street lamp 2206, the user may point the camera 1086 of the first client device 1004 toward the street lamp 2206. The view 2208 or scene of the neighborhood 2202, including the street lamp 2206 captured by the camera 1086, is presented to the user live and in real time by the augmented reality graphical display 2204 of the first client device 1004. As the user moves the first client device 1004 and the orientation and/or the focus of the camera 1086 change, the neighborhood view 2208 presented to the user via the augmented reality graphical display 2204 also changes in real time in order to display the location and/or landmark pointed to by the camera 1086.

In addition to the neighborhood view 2208 presented to the user via the augmented reality graphical display 2204, the client application 1078 presents an incident reporting tool 2010 to the user. In particular, the client application 1078 overlays the incident reporting tool 2010 over the top of the neighborhood view 2208 to create a seamless augmented reality view of the neighborhood 2208 such that the user is able to report incidents while looking at the neighborhood view 2208 in real time. In various embodiments, incidents may include safety concerns, repair requests, etc.

In one example, the incident reporting tool 2210 includes predefined incidents 2212a-2212d that a user can select and associate with an item 2206, thereby marking the item 2206 for reporting. For example, the illustrated reporting tool 2210 includes an "out streetlight" 2212a incident, an "abandoned car" 2212b incident, a "suspicious activity" 2212c incident, and a "vandalism" 2212d incident. In one example, the user may select any of the incidents 2212a-2212d by touching or dragging and dropping the incident 2212a-2212d toward the item 2206 in order to associate the incident 2212a-2212d with the item 2206.

Although the example reporting tool 2210 illustrated in FIG. 22 includes specific predefined incidents 2212a-2212d, the reporting tool 2210 may include other suitable incidents (not shown). For example, the reporting tool 2210 may include other incidents such as "graffiti," for example. In addition, although the example reporting tool 2210 includes four particular predefined incidents 2212a-2212d, the reporting tool 2210 may include any desired number of predefined incidents 2212. In one example, the client application 1078 enables a user to define/create custom incidents not already available or provided by the reporting tool 2210.

In one example, the client application 1078 enables a user to add comments or other notes (not shown) via the reporting tool 2210 when marking an incident. For example, in addition to marking an item or location 2206 with a "suspicious activity" 2012c incident, the user may also add a note that describes the suspicious activity in more detail. The client application 1078 may enable the user to add such notes either via text, via a voice recording, or by attaching an image or video, for example.

The client application 1078 also enables the user to share the identified incident or safety concern with local authorities and/or with other users in the neighborhood. Accordingly, the client application 1078 is configured to communicate selected incidents 2212 associated with identified items 2206 to the server 1030, to a police/local authority database, or to another suitable third-party database for reporting, storing, and sharing. In one example, the report incident information is used to generate a guide map between two locations, identifying the reported incidents along a path between the locations.

Figure 23:
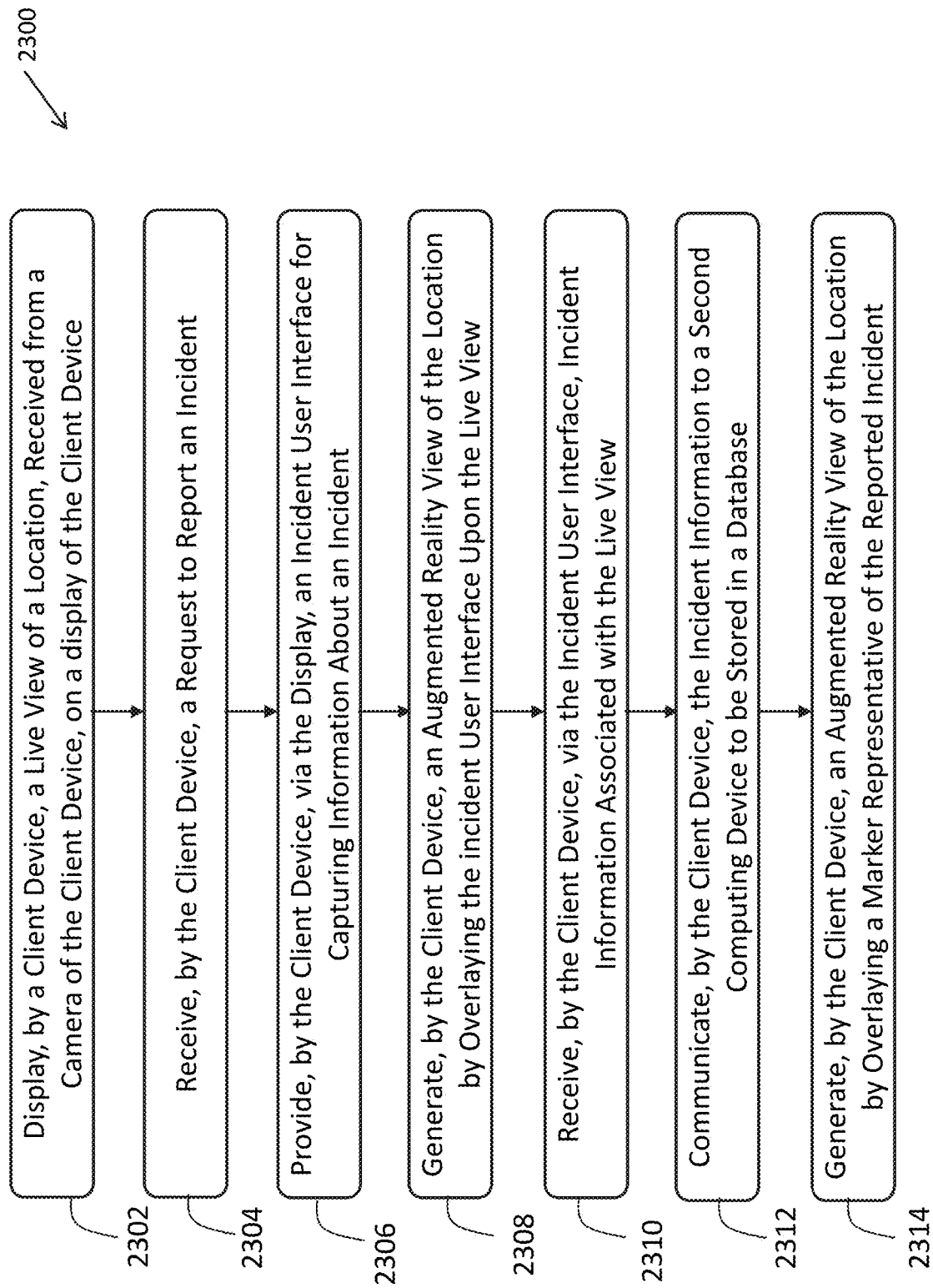
FIG. 23 is a flowchart illustrating a process for reporting an incident at a location according to one aspect of the present disclosure.
Figure 24:
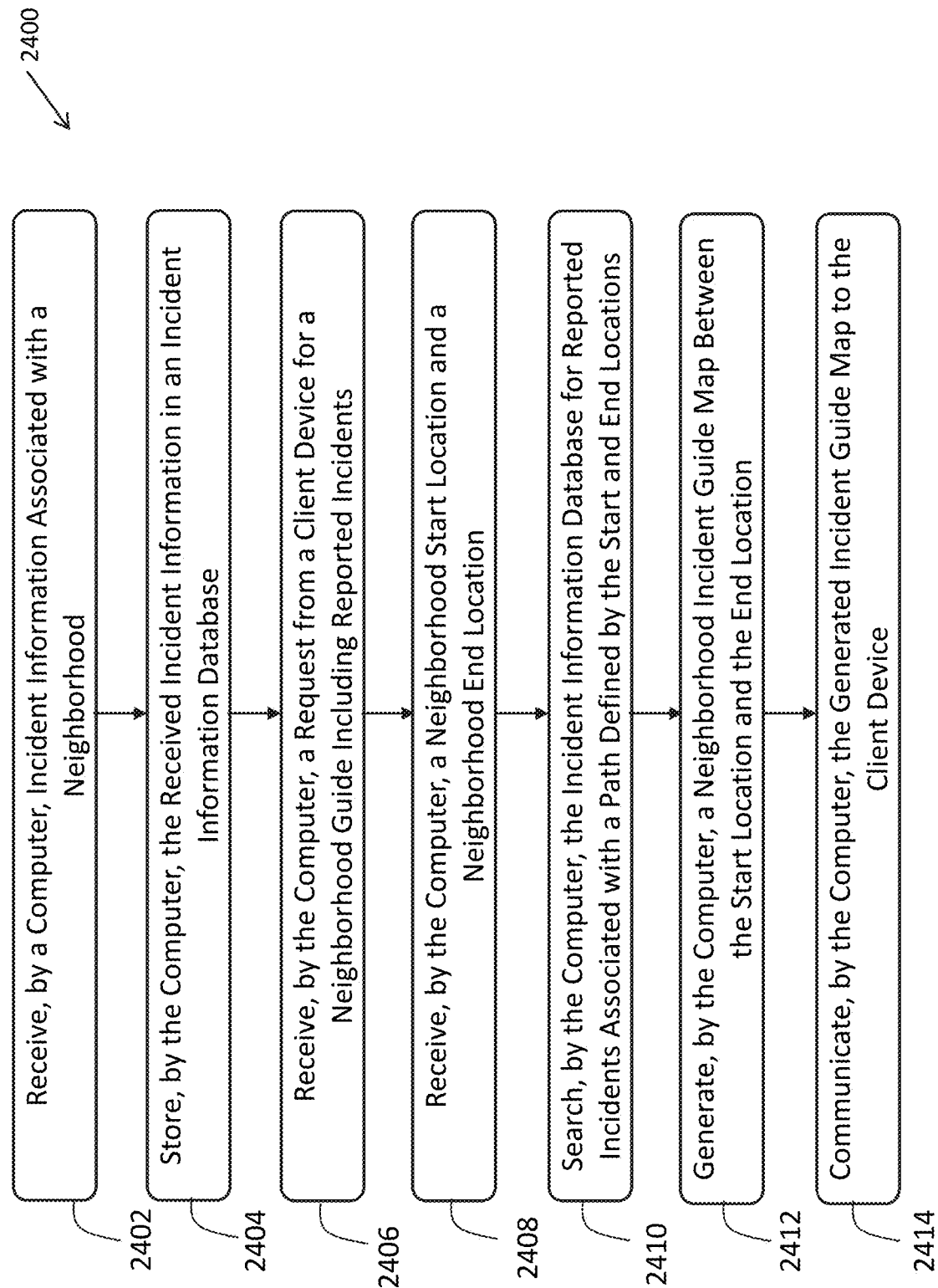
FIG. 24 is a flowchart illustrating a process for communicating crime incidents according to one aspect of the present disclosure.

The example embodiment illustrated in FIG. 22 and described above will be further understood with reference to the flowcharts illustrated in FIGS. 23 and 24. FIG. 23 is a flowchart illustrating an example method 2300 for reporting incidents, safety concerns, repair requests, etc. at a location. At block 2302, a mobile computing device, such as the first client device 1004, displays a live view 2208 of a location or item 2206, received from the camera 1086 of the first client device 1004, on the display of the first client device 1004. In one example, the live view 2208 is updated automatically in real time to correspond to the current orientation and/or focus of the camera 1086 as the user moves through the neighborhood 2202 and the orientation and/or the focus of the camera 1086 change.

At block 2304, the first client device 1004 receives a request to report an incident. For example, the client application 1078 may provide a button or another user interface for enabling a user to request such a function or feature. In one example, the incident reporting function may be requested using a motion of the first client device 1004, a hand gesture, or a voice command.

At block 2306, the first client device 1004 provides, via the display of the first client device 1004, an incident user interface 2210 for capturing information about an incident. The incident user interface 2210 may include any combination of buttons, check-boxes, text input fields, sliders, etc. for receiving input from the user about an incident. In one example, the incident user interface 2210 includes pre-defined incidents for quick selection and reporting.

At block 2308, the first client device 1004 generates an augmented reality view 2204 of the item 2206 or location by overlaying the incident user interface 2210 upon the live view 2208 of the item 2206. In one example, the augmented reality view 2204 is generated based on user-specified settings that define the layout and/or appearance.

At block 2310, the first client device 1004 receives, via the incident user interface 2210, incident information associated with the live view of the item 2206 and/or the current location of the first client device 1004. The information may be received in the form of a label, a marker, text, an image, a video, an audio recording, etc.

At block 2312, the first client device 1004 communicates the received incident information to a second computing device where the incident information is stored in a database. For example, the incident information may be communicated to the server 1030, to a police/authority database, or to any suitable third-party database. In one example, the incident information reported and stored in the second computing device may be shared with other users.

At block 2314, the first client device 1004 generates an augmented reality view 2204 of the item 2206 or location by overlaying a marker representative of the reported incident and the incident information upon the live view of the item 2206 or location. The marker may include a star, a dot, or any suitable symbol or icon. In one example, the type, shape, color, and/or size of the marker may be defined by a user. In one example, different types, colors, and styles of markers may be representative of different types of incidents. For example, a yellow lightbulb may indicate a broken streetlight while a red car may indicate an abandoned car.

FIG. 24 is a flowchart illustrating an example method 2400 for communicating incident information, such as crime information, in a neighborhood (or any other area). At block 2402, a computer, such as the server 1030, receives incident information associated with various crimes and/or other types of incidents in the neighborhood. The incident information includes location information. For example, the received incident information may include a report of an abandoned car next to a street light on Main Street (e.g., the 3500 block of Main Street).

At block 2404, the computer stores the received incident information in an incident information database. In one example, the incident information database is accessible by other users who wish to be informed about reported incidents in a given neighborhood. In one example, such reported incident information may be automatically shared with or pushed to user's devices within a neighborhood. Incident information, when received from users, may be reviewed by an administrator of the system 1000, and only approved incident information may be shared with or pushed to other user devices within a neighborhood.

At block 2406, the computer receives a request, from a requesting computing device, such as the first client device 1004, for a neighborhood guide including reported incidents. For example, the request for a neighborhood guide may comprise a request for a suggested safe route of travel between a starting point and an ending point. At block 2408, the computer receives a neighborhood start location and a neighborhood end location between which incident information is desired. In one example, the request may include a specific date range between which incident information is desired. For example, a user of the first client device 1004 may request a neighborhood guide map including reported crime and other incidents that have occurred/been reported between Main Street and First Street over the past two years.

At block 2410, the computer searches the incident information database for and identifies reported incidents that have associated location information corresponding to the path between the start location and the end location. In one example, the computer searches multiple databases, including third-party databases, for reported incident information.

Figure 25:
FIG. 25 is an example guide map according to one aspect of the present disclosure.

At block 2412, the computer generates (as illustrated in FIG. 25) a neighborhood crime/incident guide map 2500 between a start location 2502, such as Santa Monica Airport, and an end location 2504, such as Santa Monica College. The computer associates markers 2506, 2508 indicative of the identified crimes/incidents at the corresponding locations on the neighborhood crime incident guide map 2500. The markers 2506, 2508 include crime/incident information corresponding to the identified crimes/incidents. For example, the incident marker 2506 is representative of a broken light on 28th Street between Pearl Street and Ocean Park Blvd., and the incident marker 2508 is representative of an abandoned car on Pearl Street between 23rd Street and 21st Street. Although the example incident guide map 2500 includes two incident markers 2506, 2508, incident guide maps in accordance with the present embodiments may include any number of incident markers. In one example, additional information about an incident may be displayed on the guide map 2500 when a user selects, highlights, hovers over, touches, or clicks on the marker. In one example, a new window may be opened in order to display the additional incident information.

Referring back to FIG. 24, at block 2414, the computer communicates the generated incident guide map 2500 to the requesting device. In one example, rather than generating and communicating the entire incident guide map 2500, the computer communicates only the incidents in order to conserve network bandwidth. In such an example, the requesting computing device may generate the guide map based on the communicated incidents.

Although the example embodiments herein are described with reference to being implemented and executed with a client application 1078 of a first client device 1004, such as a mobile phone, the example embodiments may similarly be implemented and executed on other suitable computing devices. For example, the embodiments described may be implemented on augmented reality glasses. In addition, although the example embodiments described herein make specific reference to identifying, reporting, displaying, and analyzing incidents such as crimes, the present embodiments may similarly be used with respect to other suitable neighborhood information.

As described above, the present embodiments advantageously leverage the functionality of A/V recording and communication devices, such as A/V recording and communication doorbells, security cameras, and floodlights, to display, in augmented reality, crime location information from the A/V recording and communication devices, and from other sources. The present embodiments thus contribute to neighborhood safety by enabling users to identify and communicate crimes and other incidents that may be of interest to others and/or to law enforcement, and that may enable others to make informed decisions when navigating through a neighborhood.

Figure 26:
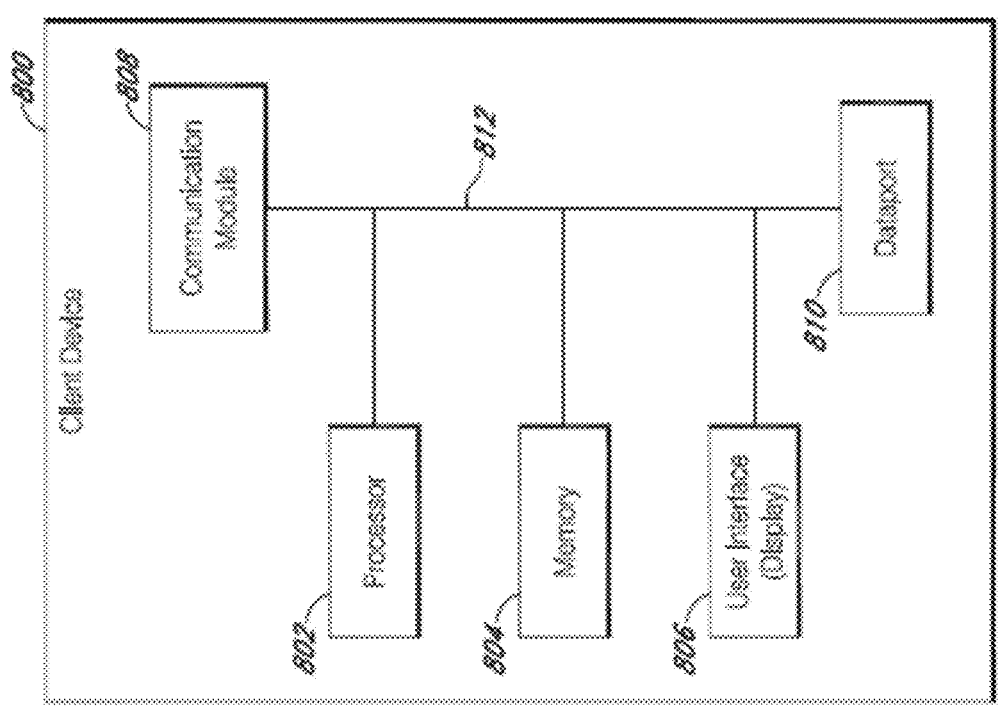
FIG. 26 is a functional block diagram of a client device on which the present embodiments may be implemented according to various aspects of the present disclosure.

FIG. 26 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 26, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 27:
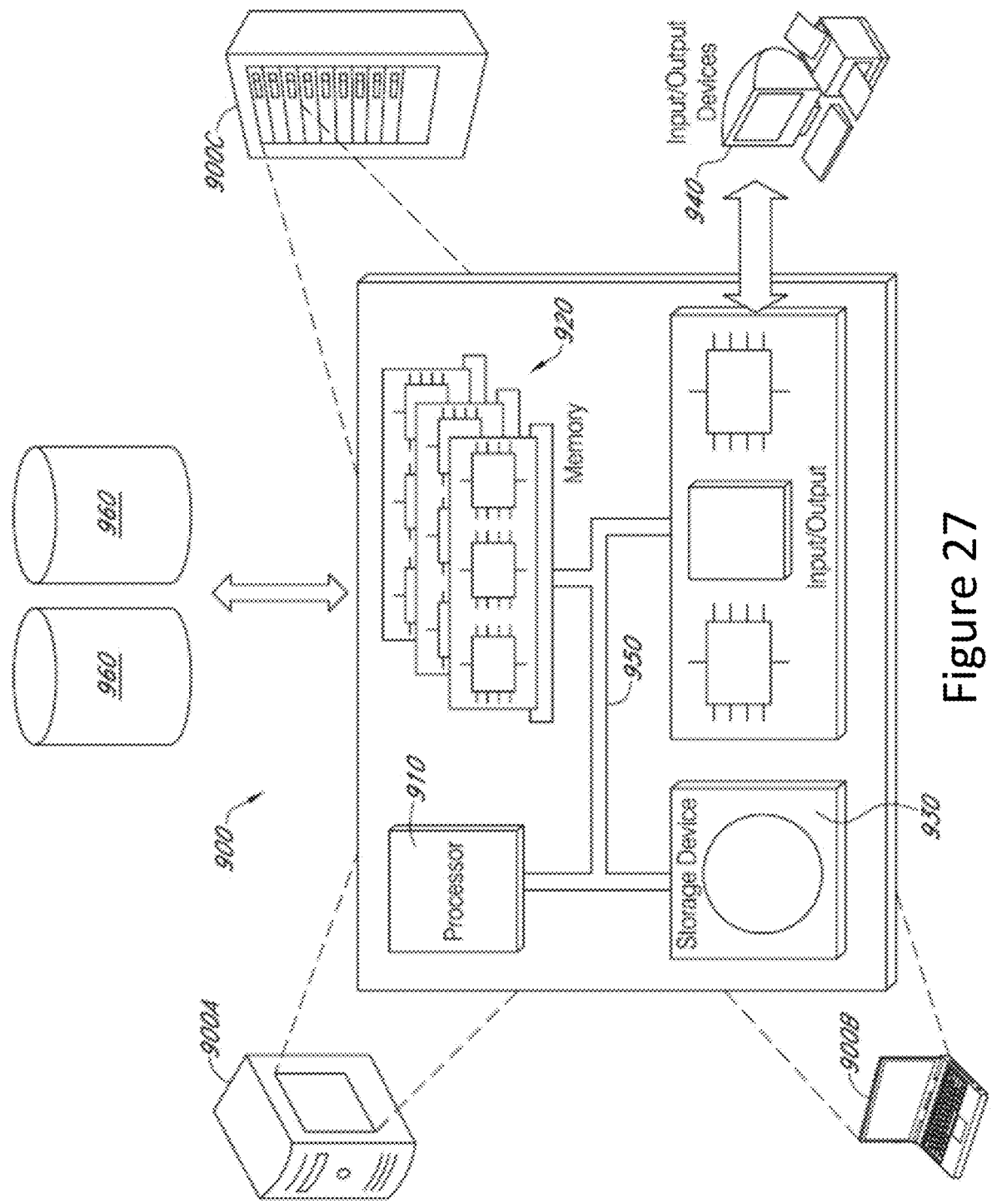
FIG. 27 is a functional block diagram of a general-purpose computing system on which the present embodiments may be implemented according to various aspects of present disclosure.

FIG. 27 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

Figure 28:
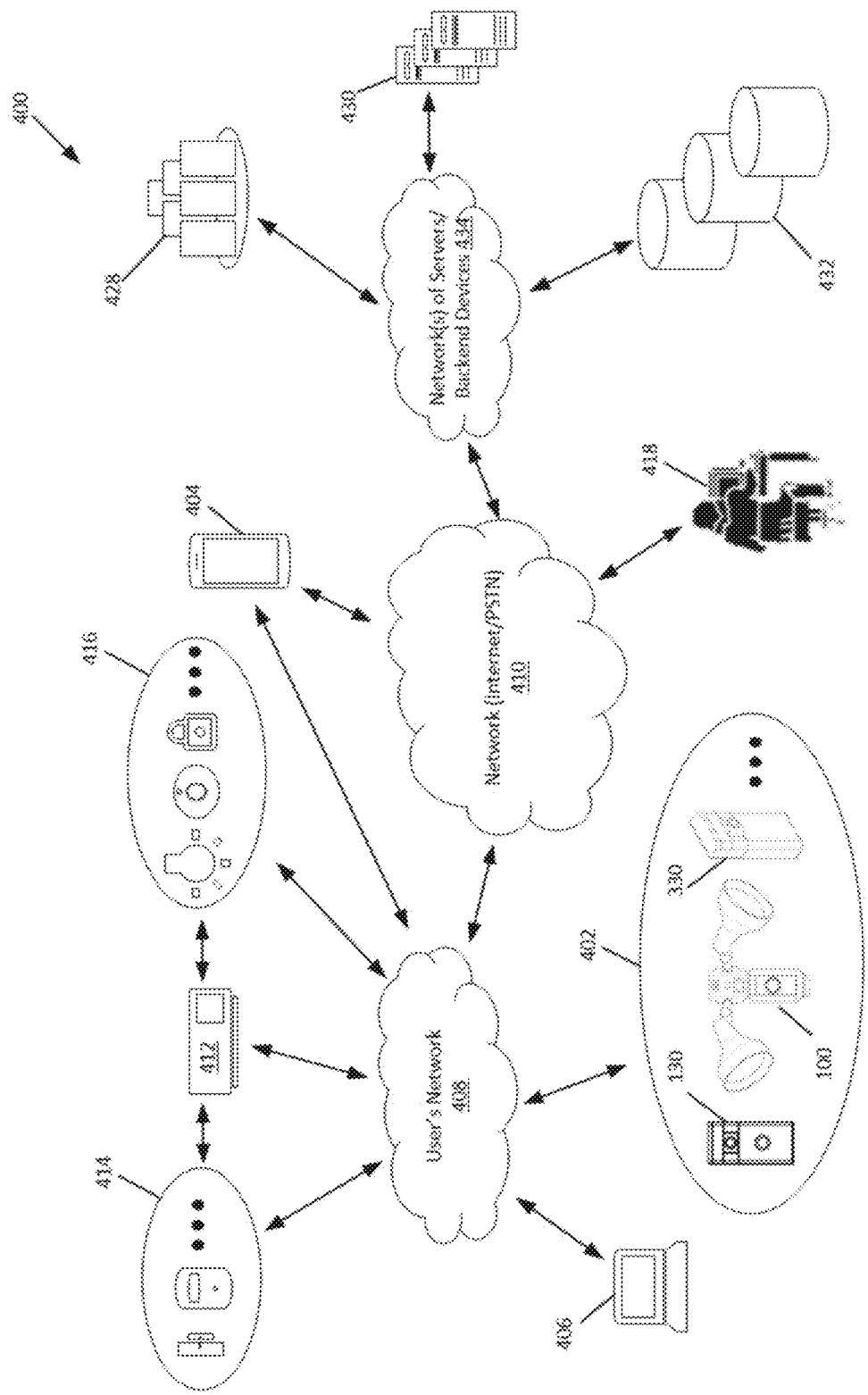
FIG. 28 is a functional block diagram illustrating a system for communication in a network according to various aspects of the present disclosure.

FIG. 28 is a functional block diagram illustrating a system 400 for communicating in a network according to various aspects of the present disclosure. The system 400 may include one or more A/V recording and communication devices 402 configured to access a user's network 408 to connect to a network (Internet/PSTN) 410 (in some embodiments, the devices 402 may be configured to connect directly to the network (Internet/PSTN) 410, such as over a cellular connection). The one or more A/V recording and communication devices 402 may include any or all of the components and/or functionality of the A/V recording and communication device 100 (FIG. 1), the A/V recording and communication doorbell 130 (FIGS. 3-5), the security camera 330 (FIGS. 6-7), and/or the floodlight controller 101 (FIGS. 8-10). The user's network 408 may include any or all of the components and/or functionality of the user's network 110 described herein.

The system 400 may also include one or more client devices 404, 406, which in various embodiments may be configured to be in network communication and/or associated with the A/V recording and communication devices 402, the hub device 412, the sensors 414, and/or the automation device 416. The client devices 404, 406 may comprise, for example, a mobile phone such as a smartphone, a computing device such as a tablet computer, a laptop computer, a desktop computer, a smartphone, etc. The client devices 404, 406 may include any or all of the components and/or functionality of the client device 114 (FIG. 1) and/or the client device 800 (FIG. 14) described herein.

The system 400 may further include a smart-home hub device 412 (which may alternatively be referred to herein as the hub device 412) connected to the user's network 408. The smart-home hub device 412 (also known as a home automation hub, gateway device, premises security hub, etc.), may comprise any device that facilitates communication with and control of the sensors 414, the automation devices 416, and/or the one or more A/V recording and communication devices 402. For example, the smart-home hub device 412 may be a component of a home automation system installed at a property. In some embodiments, the A/V recording and communication devices 402, the sensors 414, and/or the automation devices 416 may communicate with the smart-home hub device 412 directly and/or indirectly via the user's network 408 and/or the network (Internet/PSTN) 410. In some of the present embodiments, the A/V recording and communication devices 402, the sensors 414, and/or the automation devices 416 may, in addition to or in lieu of communicating with the smart-home hub device 412, communicate with the client devices 404, 406 and/or one or more of the components of the network of servers/backend devices 434 directly and/or indirectly via the user's network 408 and/or the network (Internet/PSTN) 410.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 412, the sensors 414, the automation devices 416, the A/V recording and communication devices 402, etc.), when remotely monitored and controlled via the network (Internet/PSTN) 410, may be considered to be components of the Internet of Things. Smart home systems may include switches and/or sensors (e.g., the sensors 414) connected to a central hub such as the smart-home hub device 412, sometimes called a gateway, from which the system may be controlled with a user interface. The user interface may include any or all of a wall-mounted terminal (e.g., a keypad, a touchscreen, etc.), software installed on the client devices 404, 406 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

The one or more sensors 414 may include, for example, at least one of a door sensor, a window sensor, a contact sensor, a tilt sensor, a temperature sensor, a carbon monoxide sensor, a smoke detector, a light sensor, a glass break sensor, a motion sensor, and/or other sensors that may provide the user/owner of the security system a notification of a security event at his or her property. The one or more automation devices 416 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, and/or other automation devices. As described herein, in some of the present embodiments, some or all of the user's network 408, the client devices 404, 406, the A/V recording and communication device 402, the smart-home hub device 412, the sensors 414, and/or the automation devices 416 may be referred to as a security system, one or more of which may be installed at a property or premises.

With further reference to FIG. 28, the system 400 may also include various backend devices such as (but not limited to) storage devices 432, servers 430, and APIs 428 that may be in network communication (e.g., over the user's network 408 and/or the network (Internet/PSTN) 410) with the A/V recording and communication devices 402, the hub device 412, the client devices 404, 406, the sensors 414, and/or the automation devices 416. In some embodiments, the storage devices 432 may be a separate device from the servers 430 (as illustrated) or may be an integral component of the servers 430. The storage devices 432 may be similar in structure and/or function to the storage device 116 (FIG. 1). In addition, in some embodiments, the servers 430 and APIs 428 may be similar in structure and/or function to the server 118 and the API 120 (FIG. 1), respectively.

With further reference to FIG. 28, the system 400 may also include a security monitoring service 418. The security monitoring service 418 may be operated by the same company that manufactures, sells, and/or distributes the A/V recording and communication devices 402, the hub device 412, the sensors 414, and/or the automation devices 416. In other embodiments, the security monitoring service 418 may be operated by a third-party company (e.g., a different company than the one that manufactured, sold, and/or distributed the A/V recording and communication devices 402, the hub device 412, the sensors 414, and/or the automation devices 416). In any of the present embodiments, the security monitoring service 418 may have control of at least some of the features and components of the security system 422 (e.g., the security monitoring service 418 may be able to arm and/or disarm the security system 422, lock and/or unlock doors, activate and/or deactivate one or more of the sensors 414 and/or the automation devices 416, etc.). For example, the security monitoring service 418 may operate and control their own client devices and/or network of servers/backend devices for monitoring and/or controlling security systems. In such an example, the A/V recording and communication devices 402, the hub device 412, the sensors 414, and/or the automation devices 416 may communicate with the client devices and/or one or more components of the network of servers/backend devices of the security monitoring service 418 over the network (Internet/PSTN) 410 (in some embodiments, via one or more of the components of the network of servers/backend devices 434).

Figure 29:
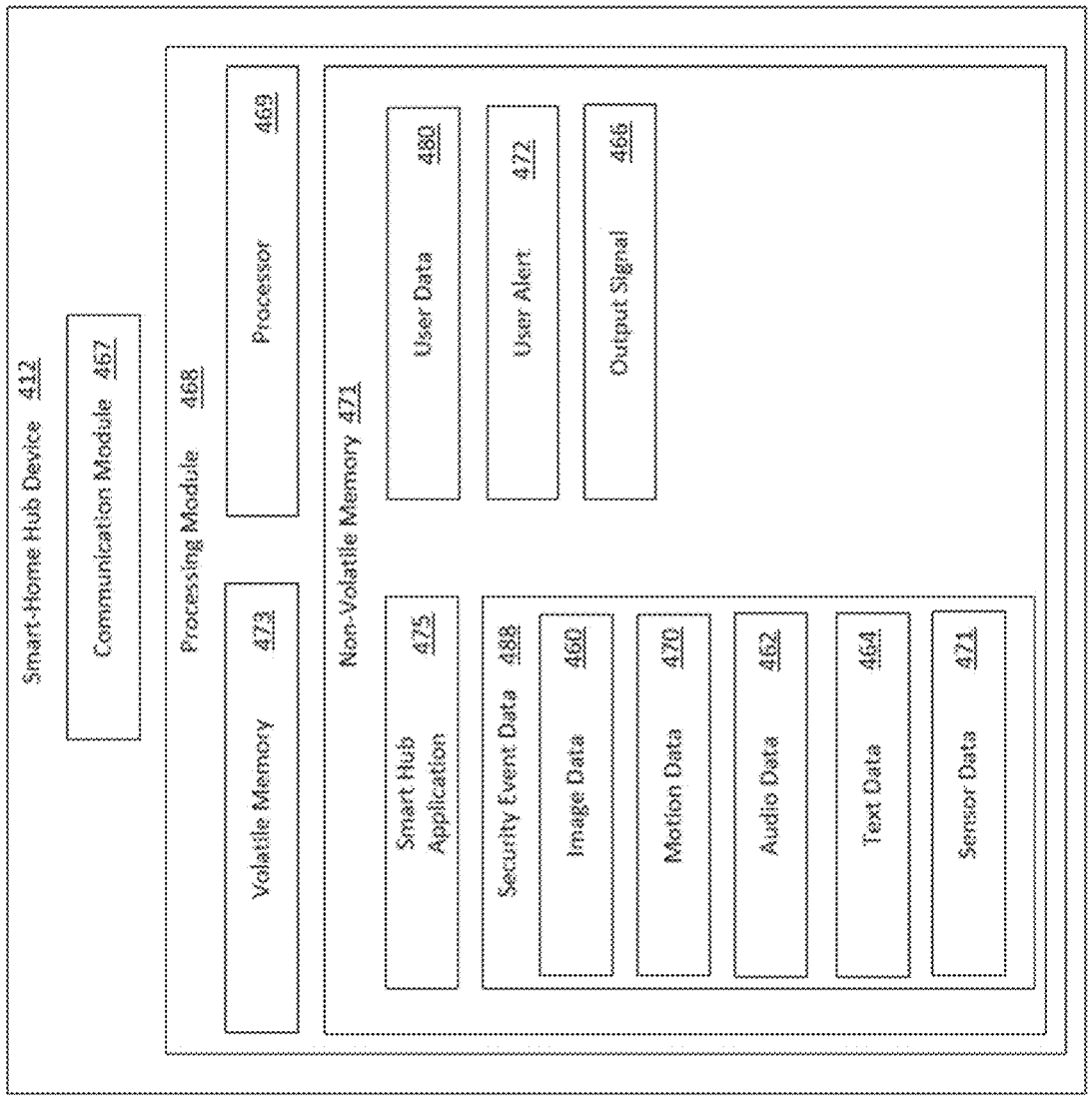
FIG. 29 is a functional block diagram illustrating one embodiment of a smart-home hub device according to various aspects of the present disclosure.

FIG. 29 is a functional block diagram illustrating an embodiment of the smart-home hub device 412 (alternatively referred to herein as the hub device 412) according to various aspects of the present disclosure. The hub device 412 may be, for example, one or more of a Wi-Fi hub, a smart-home hub, a hub of a home security/alarm system (which may be referred to as "premises security hub"), a gateway device, a hub for a legacy security/alarm system (e.g., a hub for connecting a pre-existing security/alarm system to the network (Internet/PSTN) 410 for enabling remote control of the hub device 412), and/or another similar device. The hub device 412 may comprise a processing module 468 that is operatively connected to a communication module 467. In some embodiments, the hub device 412 may comprise one or more of a camera (not shown), a microphone (not shown), and a speaker (not shown). The processing module 468 may comprise a processor 469, volatile memory 473, and non-volatile memory 471 that includes a smart-home hub application 475.

In various embodiments, the smart-home hub application 475 may configure the processor 469 to receive security event data 488, which may include one or more of image data 460, audio data 462, text data 464, motion data 470, and/or sensor data 471. The smart-home hub application 475 may configure the processor 469 to receive the security event data 488 from the A/V recording and communication device 402 and/or the client devices 404, 406 (in some embodiments, via the server 430) using the communication module 467. For example, the hub device 412 may receive and/or retrieve (e.g., after receiving a signal from the A/V recording and communication device 402 that the device 402 has been activated) the image data 460, the audio data 462, the text data 464, and/or the motion data 470 from the A/V recording and communication device 402 and/or the server 430 in response to motion being detected by the A/V recording and communication device 402. The smart-home hub application 475 may configure the processor 469 to receive the sensor data 471 from the sensors 414 and/or the automation devices 416. For example, the sensor data 471 may include a current state (e.g., opened/closed for door and window sensors, motion detected for motion sensors, living room lights on/off for a lighting automation system, etc.) of each of the sensors 414 and/or the automation devices 416. In some of the present embodiments, the sensor data 471 may be received in response to sensor triggers. The sensor triggers may be a door opening/closing, a window opening/closing, lights being turned on/off, blinds being opened/closed, etc. As such, the sensor data 471 may include the current state of the sensors 414 and/or the automation devices 416 as well as any updates to the current state based on sensor triggers.

The smart-home hub application 475 may further configure the processor 469 to receive user data 480 and/or a user alert 472 from the A/V recording and communication device 402 and/or the client devices 404, 406 (in some embodiments, via the server 430) using the communication module 467. For example, a user alert 472 may be generated by the A/V recording and communication device 402 and transmitted to the client devices 404, 406, the server 430, and/or the hub device 412. For example, in response to detecting motion, the A/V recording and communication device 402 may generate and transmit the user alert 472. In some of the present embodiments, the user alert 472 may include at least the image data 470, the audio data 462, the text data 464, the input data, and/or the motion data 460.

As described herein, at least some of the processes of the A/V recording and communication device 402 and/or the server 430 may be executed by the hub device 412. For example, without limitation, the processor 469 of the hub device 412 may analyze the security event data 488 (e.g., to determine a threat level associated with the security event data 488) and take responsive action, such as by arming an associated security system and/or sending a user alert.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In a first aspect, a method displays crime location information for a street in a neighborhood. A mobile computing device receives an input instructing display of street crime information of a neighborhood from a user of the mobile computing device. A camera of the client device is controlled to capture a live view of the neighborhood including at a first street and a second street and the live view is displayed on a display of the mobile computing device. A current location and orientation of the mobile computing device is determined. A first name of the first street and a second name of the second street are determined from a street sign detected in the live view. A message, including the current location, the first street name, and the second street name, is sent to at least one server to request the crime location information. The crime location information corresponding to the current location and the first street and the second street is received from the at least one server and a street crime summary is generated to indicate which of the first and second streets is safer based on a safety score calculated from the crime location information for the first street and the second street and a safety threshold defining a safe street, and the live view of the neighborhood is augmented with the street crime summary.

In a second aspect, a method displays crime location information associated with a neighborhood. A current location of a mobile computing device is determined and the crime location information for the current location is retrieved from at least one server. A live view, captured by a camera of the mobile computing device, of the neighborhood is displayed on a display of the mobile computing device and augmented with at least part of the crime location information.

Certain embodiments of the second aspect further include updating the crime location information and the augmented live view as the current location of the mobile computing device changes.

Certain embodiments of the second aspect further include capturing, at the mobile computing device, a user-generated comment associated with the crime location information and communicating the user-generated comment to the at least one server.

Certain embodiments of the second aspect further include receiving an input instructing the mobile computing device to initiate retrieving and displaying of the crime location information, the input comprising detecting at least one of a hand gesture, a voice command, and motion of the mobile computing device.

In certain embodiments of the second aspect, the crime location information includes at least one of a text description, an image, a video, and a hyperlink.

In certain embodiments of the second aspect, the video is generated by an audio/video recording and communication device located in the neighborhood, published by an owner of the audio/video recording and communication device, and stored at the at least one server.

In certain embodiments of the second aspect, determining the current location includes analyzing a street sign, detected in the live view, to determine a street name of a street in the neighborhood and the at least one server determines the crime location information based, at least in part, upon the street name.

In certain embodiments of the second aspect, augmenting the live view includes displaying at least part of the crime location information proximate the street sign in the live view.

Certain embodiments of the second aspect further include determining, from the crime location information, a street crime summary of crimes associated with the street and occurring during a time-period defined within a user-defined setting of the mobile computing device, wherein augmenting the live view comprises displaying the street crime summary.

Certain embodiments of the second aspect further include receiving a second input instructing the mobile computing device to display additional information, and displaying detail of the crime location information used to generate the street crime summary.

Certain embodiments of the second aspect further include calculating a safety score for the street based at least in part on the crime location information, wherein the street crime summary indicates when the street is unsafe, based on the safety score.

In certain embodiments of the second aspect, calculating the safety score includes weighting crimes of the crime location information according to type of crime, wherein violent crime is weighted more heavily than non-violent crime.

Certain embodiments of the second aspect further include determining that the street is unsafe when the safety score is greater than a safety threshold that defines a first value for violent crime and a second value for non-violent crime.

In certain embodiments of the second aspect, when the street is a first street, the street sign is a first street sign, the street name is a first street name, and the safety score is a first safety score, the method further includes: analyzing a second street sign, detected in the live view, to determine a second street name associated with a second street in the neighborhood; retrieving second crime location information from the server based, at least in part, on the second street name; calculating a second safety score for the second street based at least in part on the second crime location information; determining which of the first street and the second street is safer by comparing the first safety score and the second safety score; and indicating, in the street crime summary on the live view, which of the first street and the second street is safer.

In a third aspect, a method reports a public incident in a neighborhood. A live view, captured by a camera of the mobile computing device, of the neighborhood is displayed on a display of a mobile computing device and a location of the mobile computing device is determined. The mobile computing device receives a request to report the public incident at the current location and an incident user interface is displayed on the display. Incident information associated with the live view of the neighborhood at the current location is received via the incident user interface, and the incident information and the current location are communicated to at least one server. A marker representative of the public incident and the incident information is overlaid on the live view.

In certain embodiments of the third aspect, the incident user interface includes a plurality of selectable predefined incidents for associating with an item in the live view.

In certain embodiments of the third aspect, the mobile computing device receiving the incident information includes the mobile computing device receiving a user-generated comment.

In certain embodiments of the third aspect, the mobile computing device receiving the user-generated comment includes the mobile computing device receiving at least one of text, a voice recording, an image, and a video.

In certain embodiments of the third aspect, a visual characteristic of the marker is indicative of a type of the public incident.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for displaying crime location information for a street in a neighborhood, the method comprising:
   receiving, at a mobile computing device and from a user of the mobile computing device, an input instructing display of street crime information of a neighborhood;
   controlling a camera of the client device to capture a live view of the neighborhood including at a first street and a second street;
   displaying the live view on a display of the mobile computing device;
   determining a current location and orientation of the mobile computing device;
   determining a first name of the first street and a second name of the second street from a street sign detected in the live view;
   sending a message, including the current location, the first street name and the second street name, to at least one server to request the crime location information;
   receiving the crime location information corresponding to the current location and the first street and the second street from the at least one server;
   generating a street crime summary indicating which of the first and second streets is safer based on a safety score calculated from the crime location information for the first street and the second street and a safety threshold defining a safe street; and
   augmenting the live view of the neighborhood with the street crime summary.

2. A method for displaying crime location information associated with a neighborhood, the method comprising:
   determining a current location of a mobile computing device;
   retrieving the crime location information associated with the neighborhood based on the current location from at least one server;
   calculating a safety score for a street associated with the current location based at least in part on the crime location information;
   displaying a live view, captured by a camera of the mobile computing device, of the neighborhood on a display of the mobile computing device; and
   augmenting the live view of the neighborhood with at least part of the crime location information.

3. The method of claim 2, further comprising updating the crime location information and the augmented live view as the current location of the mobile computing device changes.

4. The method of claim 2, wherein the at least one server determines the crime location information based, at least in part, upon a street name detected in the live view.

5. The method of claim 4, further comprising determining, from the crime location information, a street crime summary of crimes associated with the street and occurring during a time-period defined within a user-defined setting of the mobile computing device, wherein augmenting the live view comprises displaying the street crime summary.

6. The method of claim 5, further comprising receiving an input instructing the mobile computing device to display additional information, and displaying detail of the crime location information used to generate the street crime summary.

7. The method of claim 2, wherein augmenting the live view comprises displaying at least part of the crime location information proximate a street sign in the live view.

8. The method of claim 2, wherein calculating the safety score comprises weighting crimes of the crime location information according to type of crime, wherein violent crime is weighted more heavily than non-violent crime.

9. The method of claim 2, wherein the street is a first street, the street sign is a first street sign, the street name is a first street name, and the safety score is a first safety score, the method further comprising:
   analyzing a second street sign, detected in the live view, to determine a second street name associated with a second street in the neighborhood;
   retrieving second crime location information from the server based, at least in part, on the second street name;
   calculating a second safety score for the second street based at least in part on the second crime location information; and determining which of the first street and the second street is safer by comparing the first safety score and the second safety score.

10. The method of claim 2, wherein the audio/video recording and communication device comprises one of a doorbell, a security camera, and a floodlight controller.

11. The method of claim 2, further comprising augmenting the live view of the neighborhood with the safety score.

12. The method of claim 2, further comprising determining that the street is safe when the safety score is below a safety threshold.

13. A method for displaying crime location information associated with a neighborhood, the method comprising:
    determining a current location of a mobile computing device;
    retrieving the crime location information for the current location from at least one server;
    calculating a safety score for a street associated with the current location based at least in part on the crime location information;
    displaying a live view, captured by a camera of the mobile computing device, of the neighborhood on a display of the mobile computing device; and
    augmenting the live view of the neighborhood with at least part of the crime location information.

14. The method of claim 13, wherein augmenting the live view comprises displaying at least part of the crime location information proximate the street sign in the live view.

15. The method of claim 13, further comprising determining, from the crime location information, a street crime summary of crimes associated with the street and occurring during a time-period defined within a user-defined setting of the mobile computing device, wherein augmenting the live view comprises displaying the street crime summary.

16. The method of claim 15, further comprising receiving a second input instructing the mobile computing device to display additional information, and displaying detail of the crime location information used to generate the street crime summary.

17. The method of claim 13, wherein calculating the safety score comprises weighting crimes of the crime location information according to type of crime, wherein violent crime is weighted more heavily than non-violent crime.

18. The method of claim 13, wherein the street is a first street, the street sign is a first street sign, the street name is a first street name, and the safety score is a first safety score, the method further comprising:
    analyzing a second street sign, detected in the live view, to determine a second street name associated with a second street in the neighborhood;
    retrieving second crime location information from the server based, at least in part, on the second street name;
    calculating a second safety score for the second street based at least in part on the second crime location information;
    determining which of the first street and the second street is safer by comparing the first safety score and the second safety score; and
    indicating, in the street crime summary on the live view, which of the first street and the second street is safer.

19. The method of claim 13, further comprising augmenting the live view of the neighborhood with the safety score.

* * * * *